(12) United States Patent
Yabuguchi

(10) Patent No.: US 12,042,951 B2
(45) Date of Patent: Jul. 23, 2024

(54) ELECTRIC WORK MACHINE

(71) Applicant: MAKITA CORPORATION, Anjo (JP)

(72) Inventor: Michisada Yabuguchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 611 days.

(21) Appl. No.: 17/331,037

(22) Filed: May 26, 2021

(65) Prior Publication Data

US 2021/0370544 A1 Dec. 2, 2021

(30) Foreign Application Priority Data

May 29, 2020 (JP) .................................. 2020-094309

(51) Int. Cl.
*B27G 19/04* (2006.01)
*B26D 7/24* (2006.01)
(Continued)

(52) U.S. Cl.
CPC .............. *B27G 19/04* (2013.01); *B26D 7/24* (2013.01); *B27B 5/38* (2013.01); *H02K 29/08* (2013.01);
(Continued)

(58) Field of Classification Search
CPC ... B27G 19/04; H02P 6/17; H02P 3/22; H02P 6/24; B26D 7/24; B27B 5/38; H02K 29/08
(Continued)

(56) References Cited

U.S. PATENT DOCUMENTS 4,249,117 A 2/1981 Leukhardt et al.
4,267,914 A 5/1981 Saar
(Continued)

FOREIGN PATENT DOCUMENTS

JP S646898 B2 2/1989
JP 2013243824 A 12/2013
(Continued)

OTHER PUBLICATIONS

Office Action from the Japanese Patent Office dispatched Dec. 12, 2023 in related Japanese application No. 2020-094309, and translation thereof.
(Continued)

*Primary Examiner* — Omar Flores Sanchez
(74) *Attorney, Agent, or Firm* — J-TEK LAW PLLC; Jeffrey D. Tekanic; Scott T. Wakeman

(57) ABSTRACT

An electric work machine (1) includes a motor (1), a manipulatable part (9), a control part (20) configured to perform a first braking control and a second braking control that differ from each other, and a kickback-detection part (20, S30) that detects whether kickback has occurred. The control part energizes the motor in response to detection of user-manipulation of the manipulatable part. In response to detection of kickback, the control part performs the first braking control and thereby causes the motor to generate a first braking force. In response to detection of a state change of the manipulatable part to an unmanipulated or OFF state, the control part performs the second braking control and thereby causes the motor to generate a second braking force, which is weaker than the first braking force.

21 Claims, 23 Drawing Sheets

(51) Int. Cl.
　　　*B27B 5/38* (2006.01)
　　　*H02K 29/08* (2006.01)
　　　*H02P 3/22* (2006.01)
　　　*H02P 6/17* (2016.01)
　　　*H02P 6/24* (2006.01)

(52) U.S. Cl.
　　　CPC .............. *H02P 3/22* (2013.01); *H02P 6/17* (2016.02); *H02P 6/24* (2013.01)

(58) Field of Classification Search
　　　USPC ...................................................... 83/62–63
　　　See application file for complete search history.

(56) References Cited

U.S. PATENT DOCUMENTS

| | | | |
|---|---|---|---|
| 6,479,958 | B1 | 11/2002 | Thompson et al. |
| 9,496,809 | B2 | 11/2016 | Nakano et al. |
| 2012/0036725 | A1* | 2/2012 | Osborne ............... B27B 17/083 83/62.1 |
| 2013/0307446 | A1 | 11/2013 | Ichikawa |
| 2014/0368133 | A1 | 12/2014 | Nakano et al. |
| 2015/0137717 | A1* | 5/2015 | Ishikawa ................... H02P 3/12 318/379 |
| 2017/0093315 | A1 | 3/2017 | Ichikawa |
| 2018/0367070 | A1 | 12/2018 | Ichikawa |
| 2019/0013762 | A1* | 1/2019 | Yamaguchi ......... H02P 29/0022 |
| 2021/0370544 | A1* | 12/2021 | Yabuguchi ................ H02P 6/24 |
| 2023/0278251 | A1* | 9/2023 | Burke ..................... F16D 65/18 83/62.1 |

FOREIGN PATENT DOCUMENTS

| | | |
|---|---|---|
| JP | 2015100156 A | 5/2015 |
| JP | 6003078 B2 | 10/2016 |
| JP | 2017070102 A | 4/2017 |
| JP | 2019004614 A | 1/2019 |
| JP | 2019198951 A | 11/2019 |

OTHER PUBLICATIONS

Office Action from the Japanese Patent Office dispatched Mar. 12, 2024 in counterpart Japanese application No. 2020-094309, and machine translation thereof.

* cited by examiner

ELECTRIC WORK MACHINE

CROSS-REFERENCE TO RELATED APPLICATION

The present application claims priority to Japanese patent application No. 2020-094309 filed on May 29, 2020, the contents of which are hereby fully incorporated herein by reference.

TECHNICAL FIELD

The present disclosure relates to an electric work machine, such as a power tool, that is capable of performing motor braking.

BACKGROUND ART

U.S. Pat. No. 4,267,914 discloses a technique for stopping the supply of electric power to a motor of an electric work machine in response to detection of kickback (i.e., when the electric work machine kicks back or recoils from a work object or a workpiece owing to, e.g., binding or pinching of the tool accessory).

SUMMARY OF THE INVENTION

When braking is applied to a motor, e.g., while a cutting tool of the electric work machine is rotating, the rotation of the cutting tool can be stopped faster than in a situation in which braking is not applied; however, a stronger recoil may be felt by the user. That is, the higher the rotational speed, the larger the recoil when braking is applied to the motor. But, if kickback has occurred or is occurring, then it is preferable to immediately stop the rotation of the rotor of the motor of the electric work machine, in order to prevent injury to the user and/or damage to the workpiece. On the other hand, if kickback is not occurring, then it is preferable to not abruptly stop the rotation of the rotor of the motor of the electric work machine so as to minimize the recoil that is felt by the user.

It is therefore one non-limiting object of the present disclosure to disclose techniques for decreasing the amount of time until rotation of the rotor of the motor is stopped after the occurrence of kickback while also reducing the amount of recoil experienced by the user by increasing the amount of time until the rotation of the rotor of the motor stops when a manipulatable switch (e.g., a trigger), with which the user controls energization of the motor, is turned OFF (e.g. released).

In one non-limiting aspect of the present disclosure, an electric work machine comprises a motor (e.g., an electric motor, such as a brushless motor), a manipulatable part (e.g., a trigger switch, a slide switch, a toggle switch, etc.), a control part (e.g., a control circuit or a controller comprising a microprocessor), which is preferably electrically connected to the manipulatable part, and a kickback-detection part or circuit, which is preferably electrically connected to the control part and/or is a part of the control part.

The manipulatable part is configured to be manually manipulated (operated) by a user. The control part is configured to energize the motor (e.g., to cause a rotor to rotate) when the manipulatable part is manipulated (e.g., pulled, slid/moved to an ON position, etc.).

The kickback-detection part is configured to detect kickback, which is a sudden and unintended movement of the tool or workpiece that is typically caused by binding or pinching of the tool accessory and causes the electric work machine to kick back (rebound, recoil) from a work object, such as a workpiece, a surface to be processed, etc. The control part is configured to perform a first braking control and a second braking control, which differ from each other.

The first braking control may be performed in the situation in which kickback has been detected by the kickback-detection part and the first braking control causes the motor to generate a first braking force to immediately (abruptly) stop rotation of the rotor of the motor. The second braking control may be performed in the situation in which the manipulatable part has changed from a manipulated state (e.g, an ON state), in which the manipulatable part is manipulated (e.g., pulled, moved an ON position, etc.), to an unmanipulated state (e.g., a released state or an OFF state), in which the manipulatable part is not manipulated (e.g., released) or is moved to an OFF position, etc.; the second braking control causes the motor to generate a second braking force, which is weaker than the first braking force, such that the rotor is decelerated less rapidly than when the first braking force is applied to the motor. Thus, when the second braking force is applied, the user experiences less recoil than when the first braking force is applied.

More specifically, when kickback has been detected, such an electric work machine is designed to generate the first (stronger) braking force to thereby shorten the amount of time until the rotation of the rotor stops as much as possible, in order to prevent or reduce the likelihood of injury or damage. On the other hand, when the user causes or allows the manipulatable part to be moved to the OFF state, such an electric work machine is designed to generate the second braking force that is weaker than the first braking force applied when kickback has occurred, thereby reducing the amount of recoil that is generated owing to the deceleration of the rotor. Owing to this design, such an electric work machine can shorten the time until the rotor rotation stops when kickback has occurred while also reducing the recoil generated in response to the motor rotational speed decreasing, e.g., when the user stops manipulating the manipulatable part, thereby reducing the recoil felt by the user.

In one embodiment of the present disclosure, the motor is a three-phase brushless motor, and an inverter, which comprises a plurality of switching devices, supplies three-phase alternating current to the motor. Furthermore, the control part may be configured such that the first braking control causes the first braking force to be generated by switching the ON/OFF state of each of a plurality of the switching devices in accordance with a motor rotational angle of the motor. In addition, the control part may be configured such that the second braking control causes the second braking force to be generated by switching the ON/OFF state of each of a plurality of the switching devices in accordance with the motor rotational angle of the motor. Furthermore, the control part may be configured such that the motor rotational angle when the first braking control switches the ON/OFF state of each of the plurality of switching devices and the motor rotational angle when the second braking control switches the ON/OFF state of each of the plurality of switching devices differ from one another.

In addition or in the alternative, the first braking control may generate the first braking force by switching the ON/OFF state of each of the plurality of switching devices at a timing at which the motor has rotated by a preset first braking delay angle from a preset reference timing. In addition, the second braking control may generate the second braking force by switching the ON/OFF state of each of the plurality of switching devices at a timing at which the motor has rotated by a preset second braking delay angle from the reference timing. Furthermore, the second braking delay angle may be larger than the first braking delay angle.

In addition or in the alternative, the first braking control may generate the first braking force by using at least three-phase, short-circuit braking; and the second braking control may generate the second braking force by using at least two-phase, short-circuit braking.

In addition or in the alternative, a ratio of three-phase braking periods performed during the first braking control, in which the braking force for the motor is generated by supplying electric current to all three phases of the three-phase brushless motor, may be larger than a ratio of three-phase braking periods performed during the second braking control; and a ratio of two-phase braking periods performed during the second braking control, in which the braking force is generated by supplying electric current to two phases of the three phases of the three-phase brushless motor, may be larger than a ratio of two-phase braking periods performed during the first braking control.

In addition or in the alternative, a ratio of two-phase braking periods performed during the first braking control, in which the braking force for the motor is generated by supplying electric current to two phases of the three phases of the three-phase brushless motor, may be larger than a ratio of two-phase braking periods performed during the second braking control; and a ratio of brake-OFF periods performed during the second braking control, in which the braking force is generated by not supplying electric current to all three phases of the three-phase brushless motor, may be larger than a ratio of brake-OFF periods performed during the first braking control.

In another non-limiting aspect of the present disclosure, an electric work machine comprises a motor (e.g., an electric motor, such as a brushless motor), a manipulatable part (e.g., a trigger, a slide switch, a toggle switch, etc.), a control part (e.g., a control circuit or a a controller that includes a microprocessor, etc.), which is preferably electrically connected to the manipulatable part, and a kickback-detection part (or circuit), which is preferably electrically connected to the control part and/or is a part of the control part. The control part is configured to perform a third braking control and a fourth braking control.

In the third braking control, immediately after kickback has been detected by the kickback-detection part, a braking force for stopping rotation of the rotor is generated for the motor. In the fourth braking control, in the situation in which the manipulatable part has changed from a manipulated state, in which the manipulatable part is manipulated (e.g., in an ON state), to an unmanipulated or OFF state, in which the manipulatable part is not manipulated or is moved to an OFF position, the braking force is generated after a preset standby time has elapsed.

In response to detection of kickback, such an electric work machine generates the braking force immediately after the kickback detection, in order to shorten the time until the rotor rotation stops. On the other hand, when the user stops manipulating the manipulatable part (or moves the manipulatable part to an OFF position), the electric work machine waits until after the standby time has elapsed to generate the braking force, in order to avoid a sudden or abrupt drop in the rotor rotational speed and thereby reduce the recoil generated by a sudden, large deceleration of the rotor. Owing to this design, such an electric work machine can shorten the time until the rotor rotation stops when kickback has occurred while also reducing the recoil generated (in response to the motor rotational speed decreasing, e.g., when the user stops manipulating the manipulatable part) and imparted to the user.

In another non-limiting aspect of the present disclosure, an electric work machine comprises a motor (e.g., an electric motor, such as a brushless motor), a manipulatable part (e.g., a trigger, a slide switch, a toggle switch, etc.), a control part (e.g., a control circuit or a a controller that includes a microprocessor, etc.), which is preferably electrically connected to the manipulatable part, and a kickback-detection part (or circuit), which is preferably electrically connected to the control part and/or is a part of the control part. The control part is configured to perform a fifth braking control and a sixth braking control.

In the fifth braking control, immediately after the kickback has been detected by the kickback-detection part, a braking force for stopping rotation of the rotor is generated for the motor. In the sixth braking control, in the situation in which the manipulatable part has changed from a manipulated state (e.g., in an ON state), in which the manipulatable part is manipulated, to an unmanipulated or OFF state, in which the manipulatable part is not manipulated or is moved to an OFF position, the braking force is generated after the rotor rotational speed of the motor has become (has fallen to) a preset prescribed rotor rotational speed or less.

In response to detection of kickback, such an electric work machine generates the braking force immediately after the kickback detection, in order to shorten the time until the rotor rotation stops as much as possible. On the other hand, when the user stops manipulating the manipulatable part (or moves the manipulatable part to an OFF position), the electric work machine waits until after the rotor rotational speed has become a prescribed rotational speed or less to generate the braking force, in order to avoid a sudden, abrupt drop in the rotor rotational speed and thereby can reduce the recoil generated by a sudden, large deceleration of the rotor. Owing to this design, such an electric work machine can shorten the time until the rotor rotation stops when kickback has occurred while also reducing the recoil generated (in response to the motor rotational speed decreasing, e.g., when the user stops manipulating the manipulatable part) and imparted to the user.

DETAILED DESCRIPTION OF EMBODIMENTS OF THE PRESENT DISCLOSURE

First Embodiment

A first embodiment of the present disclosure will be explained below, with reference to the drawings.

Figure 1:
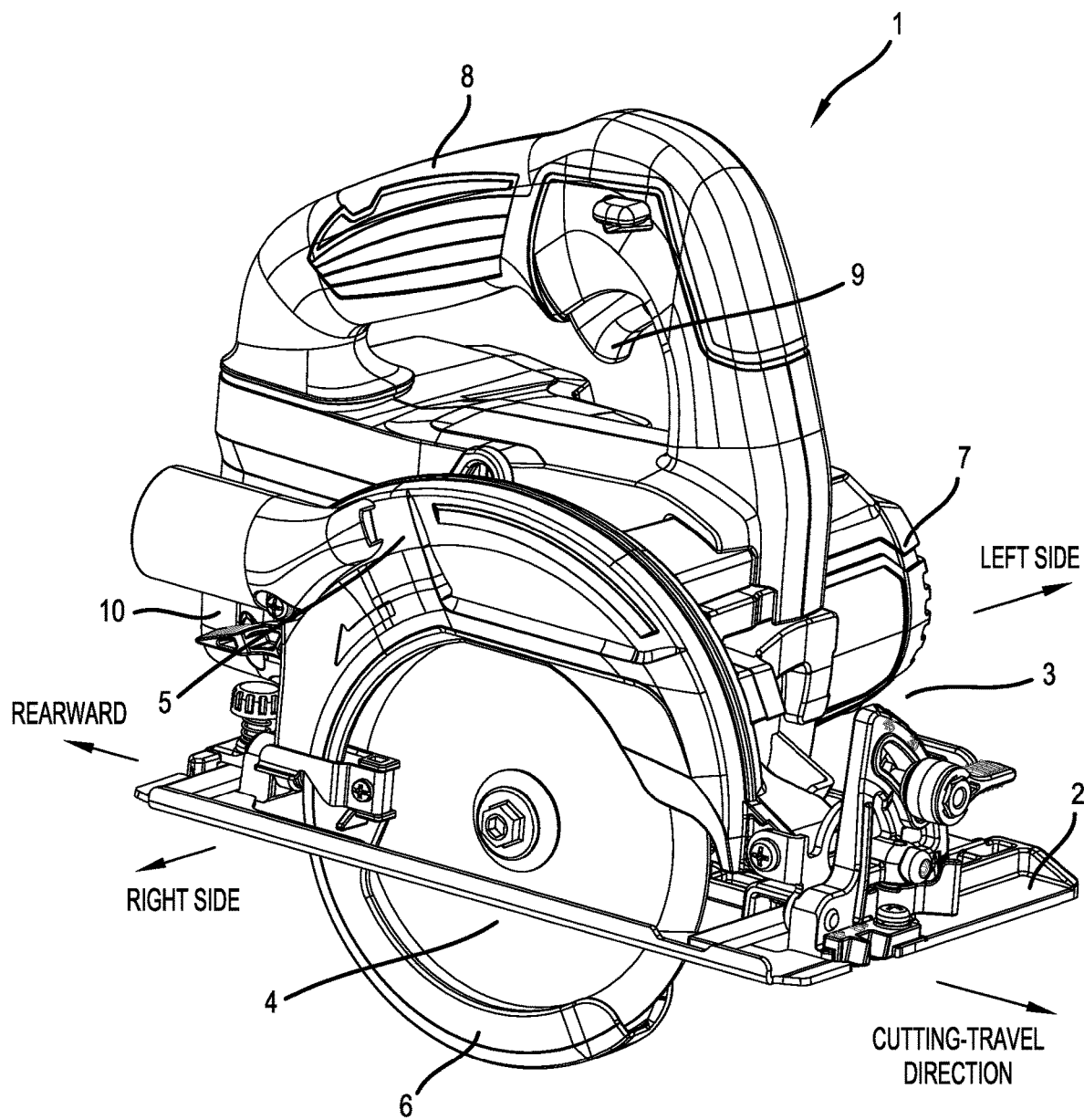
FIG. 1 is an oblique view that shows the overall configuration of a representative, non-limiting electric work machine (power tool) according to the present teachings.

As shown in FIG. 1, an electric work machine 1 of the present first embodiment is a circular saw that is primarily used for cutting workpieces, such as, e.g., wooden boards.

The electric work machine 1 comprises a base 2 and a main-body part 3. The base 2 is a substantially rectangular-shaped member that is designed to contact an upper surface of a workpiece to be cut when the work of cutting the workpiece is performed. The main-body part 3 is disposed on the upper-surface side of the base 2.

The main-body part 3 comprises a circular-shaped saw blade 4, a saw-blade case 5, and a cover 6. The saw blade 4 is disposed on the right side of the main-body part 3 in a cutting-travel direction. The saw-blade case 5 is formed such that it internally houses and covers a substantially semicircular extent of a circumferential edge of the upper side of the saw blade 4.

The cover 6 is formed such that it covers a substantially semicircular extent of the circumferential edge of the lower side of the saw blade 4. The cover 6 is a movable open/close type, and FIG. 1 shows the state in which the cover 6 is closed. By moving the electric work machine 1 in the cutting-travel direction when cutting the workpiece, the saw blade 4 rotates about its center of rotation in the counter-clockwise direction in FIG. 1, and the cover 6 continuously opens. Thereby, the saw blade 4 is exposed, and that exposed portion proceeds to cut into the workpiece.

Figure 2:
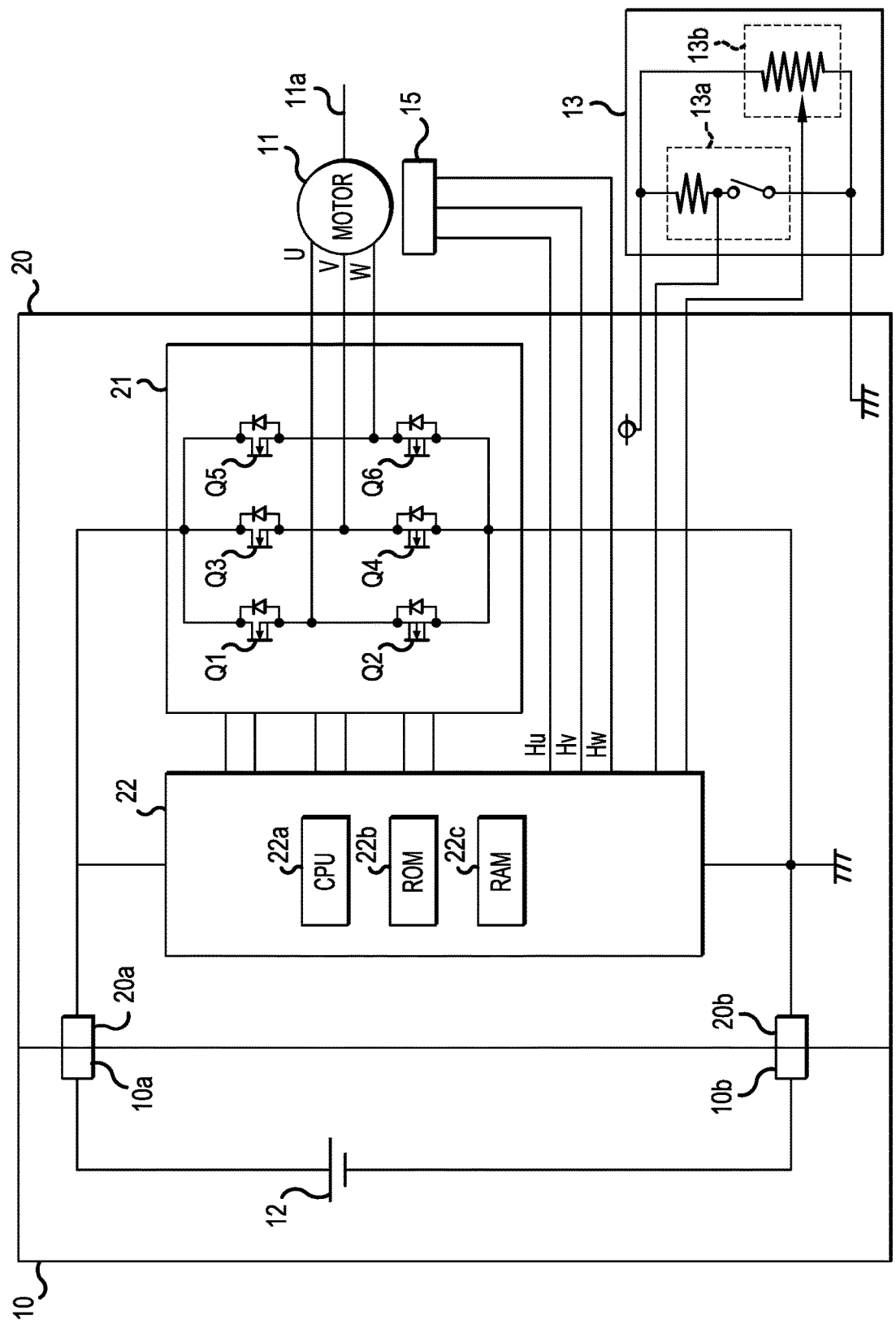
FIG. 2 is a block diagram that shows the electrical configuration (circuit diagram) of the electric work machine of FIG. 1.

A substantially cylindrical-shaped motor case 7 is installed on the left side of the main-body part 3. A motor 11, which is the drive source of the electric work machine 1, is housed in the interior of the motor case 7. It is noted that the motor 11 is not shown in FIG. 1 but is shown in FIG. 2.

A gear mechanism, which is not shown, is housed between the motor case 7 and the saw blade 4. When the rotor 11a of the motor 11 rotates, that rotation is transmitted to the saw blade 4 via the gear mechanism, and thereby the saw blade 4 rotates.

A handle 8, which is gripped by a user during operation of the electric work machine 1, is disposed on the upper side of the main-body part 3. The handle 8 is mounted, such that it exhibits an arch or looped shape, on the upper side of the main-body part 3. That is, one end of the handle 8 is fixed to the rear-end side of the main-body part 3 in the cutting-travel direction, and the other end of the handle 8 is fixed to the side of the main-body part 3 that is forward of the rear end in the cutting-travel direction.

A trigger 9 is mounted on the handle 8. When the user of the electric work machine 1 is gripping (holding) the handle 8, the user can pull (squeeze) and return (release) the trigger 9 using his/her index finger. It is noted that the user of the electric work machine 1 can pull the trigger 9 only while a lock-OFF lever, which is disposed in the vicinity of the trigger 9 and protrudes from the handle 8 in the left-right direction, has been manipulated to the lock off (lock disengaged) position. Specifically, the user of the electric work machine 1 can pull the trigger 9 to energize the motor 11 only by first pushing the lock-OFF lever from the left side or from the right side. In the following description, the state in which the trigger 9 has been pulled is referred to as the "ON state", and the state in which the trigger 9 has been returned to its original position (i.e. released) is referred to as the "OFF state".

A battery pack 10 houses a rechargeable battery 12 (e.g., one or more electrically-connected battery cells, such lithium-ion battery cells) and is detachably mounted on the rear end of the main-body part 3. When the trigger 9 is pulled in the state in which the battery pack 10 is mounted on the main-body part 3, the rotor 11a of the motor 11 inside the main-body part 3 rotates owing to the supply of electric power from the battery 12. It is noted that the battery 12 is not shown in FIG. 1 but is shown in FIG. 2.

As shown in FIG. 2, the electric work machine 1 comprises a control unit 20. The control unit 20 comprises a power-supply (e.g., positive) terminal 20a and a ground (e.g., negative) terminal 20b. When the battery pack 10 is mounted on the main-body part 3, the power-supply terminal 20a and the ground terminal 20b are electrically connected to a power-supply (e.g., positive) terminal 10a and a ground (e.g., negative) terminal 10b, respectively, of the battery pack 10.

The power-supply terminal 10a of the battery pack 10 is connected to the positive electrode of the battery 12. The ground terminal 10b of the battery pack 10 is connected to the negative electrode of the battery 12.

The control unit 20 receives the supply of electric power from the battery 12 inside the battery pack 10 and thereby drives (energizes) and controls the motor 11. In the present embodiment, the motor 11 is a three-phase brushless motor.

The control unit 20 comprises a three-phase inverter 21 and a controller 22.

The three-phase inverter 21 is a circuit designed to receive the supply of electric power from the battery 12 and to supply electric current to a winding wire of each phase of the motor 11. In the present embodiment, the three-phase inverter 21 is configured as a three-phase, full-bridge circuit that comprises six switching devices Q1, Q2, Q3, Q4, Q5, Q6. In the present embodiment, each of the switching devices Q1-Q6 is a MOSFET.

In the three-phase inverter 21, the switching devices Q1, Q3, Q5 are respectively disposed in power-supply lines that provide connections between the terminals U, V, W of the motor 11 and the positive electrode of the battery 12. The switching devices Q2, Q4, Q6 are respectively disposed in ground lines that provide connections between the terminals U, V, W of the motor 11 and the negative electrode of the battery 12.

The controller 22 is principally constituted by a microcomputer (microprocessor), which comprises a CPU 22a, ROM 22b, RAM 22c, etc. The various functions of the microcomputer are achieved by the CPU 22a executing a program, which is stored in a nonvolatile, physical recording medium. In this example, the ROM 22b corresponds to the nonvolatile, physical recording medium that stores the program. In addition, by executing this program, a method that corresponds to the program is performed. It is noted that a portion or all of the functions executed by the CPU 22a may be configured as hardware using one or a plurality of ICs or the like. In addition, one or a plurality of microcomputers may constitute the controller 22.

In addition, the electric work machine 1 comprises a trigger switch 13 and a Hall-effect sensor unit 15.

The trigger switch 13 comprises a main switch 13a, which changes to the ON state when the trigger 9 is pulled, and a manipulation-amount detection part 13b, which detects the amount by which the trigger 9 is pulled.

The main switch 13a outputs a trigger signal and is preferably a binary switch (ON/OFF switch) such as a pushbutton switch or contact switch. The trigger signal is a signal that becomes HI when the trigger 9 has been pulled and is in the ON state and becomes LOW when the trigger 9 has been returned (released) to its initial (original) position and is in the OFF state. The manipulation-amount detection part 13b is a variable resistor (e.g., a potentiometer) whose resistance value changes in accordance with the pulled amount of the trigger 9. The main switch 13a and the manipulation-amount detection part 13b are electrically connected to the controller 22.

The Hall-effect sensor unit 15 is a rotational-position sensor that comprises Hall-effect devices. The Hall-effect sensor unit 15 outputs position-detection signals Hu, Hv, Hw (hereinbelow, Hall-effect sensor signals) in each of the U, V, and W phases based on changes in the magnetic field attendant with the rotation of the rotor 11a of the motor 11. The Hall-effect sensor signals Hu, Hv, Hw switch between HI and LOW every time the rotor 11a of the motor 11 rotates by an electrical angle of 180°. Furthermore, the phases of the Hall-effect sensor signals Hu, Hv, Hw are offset from one another by an electrical angle of 120°. Consequently, every time the rotor 11a of the motor 11 rotates by an electrical angle of 60°, a level-change edge occurs in one of the Hall-effect sensor signals Hu, Hv, Hw. The term "level-change edge" (hereinbelow, simply "edge") includes both a rising edge from LOW to HI and a trailing (falling) edge from HI to LOW. In addition, the Hall-effect sensor signals Hu, Hv, Hw are collectively referred to as the Hall-effect sensor signals H. The Hall-effect sensor signals Hu, Hv, Hw are input to the controller 22.

Figure 3:
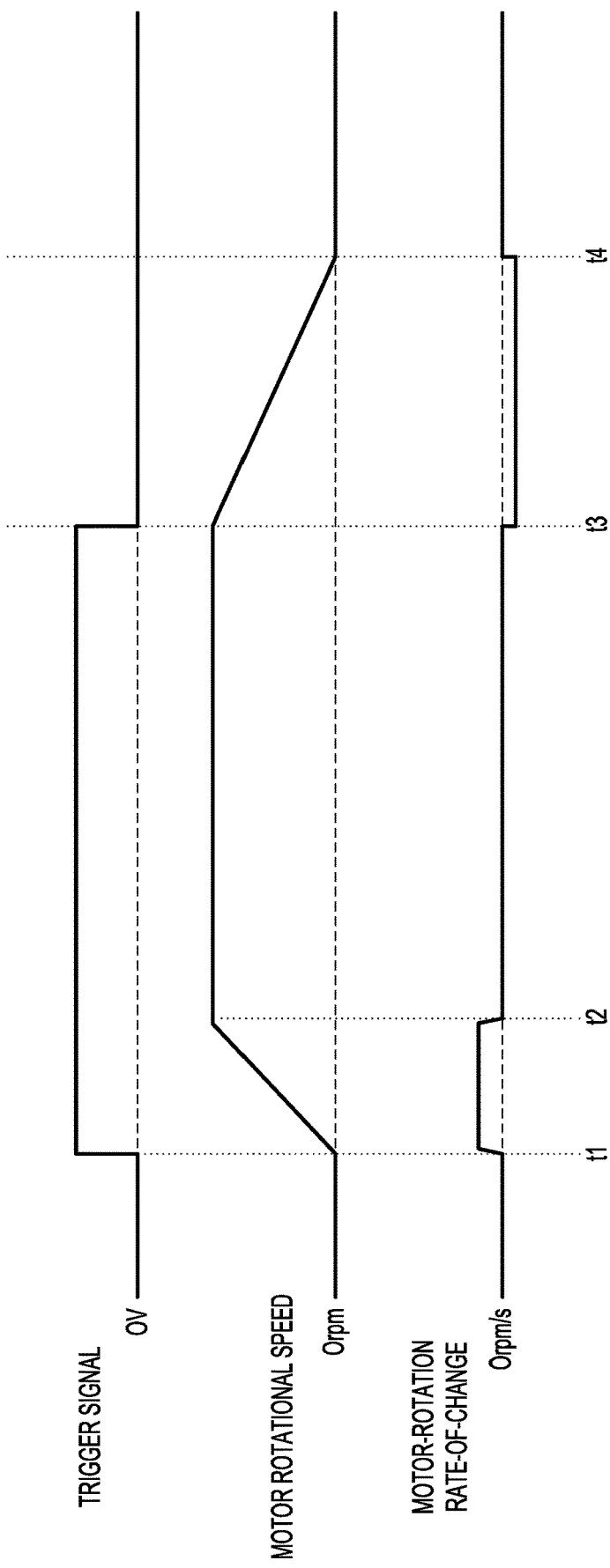
FIG. 3 is a timing chart that shows the change in motor rotational speed when an at-trigger-OFF braking process is performed.

As shown in FIG. 3, when the trigger signal switches from LOW to HI at the time t1, the control unit 20 starts a process of driving (energizing) the motor 11. Thereby, the motor rotational speed continuously (steadily) increases to the time t2, at which the motor rotational speed becomes the rotational speed that corresponds to the pulled amount of the trigger 9.

Subsequently, when the trigger signal switches from HI to LOW at the time t3, the control unit 20 starts an "at-trigger-OFF" braking process, which is defined and further described below. Thereby, the motor rotational speed continuously (steadily) decreases until the time t4, at which the motor rotational speed becomes 0 rpm.

Figure 4:
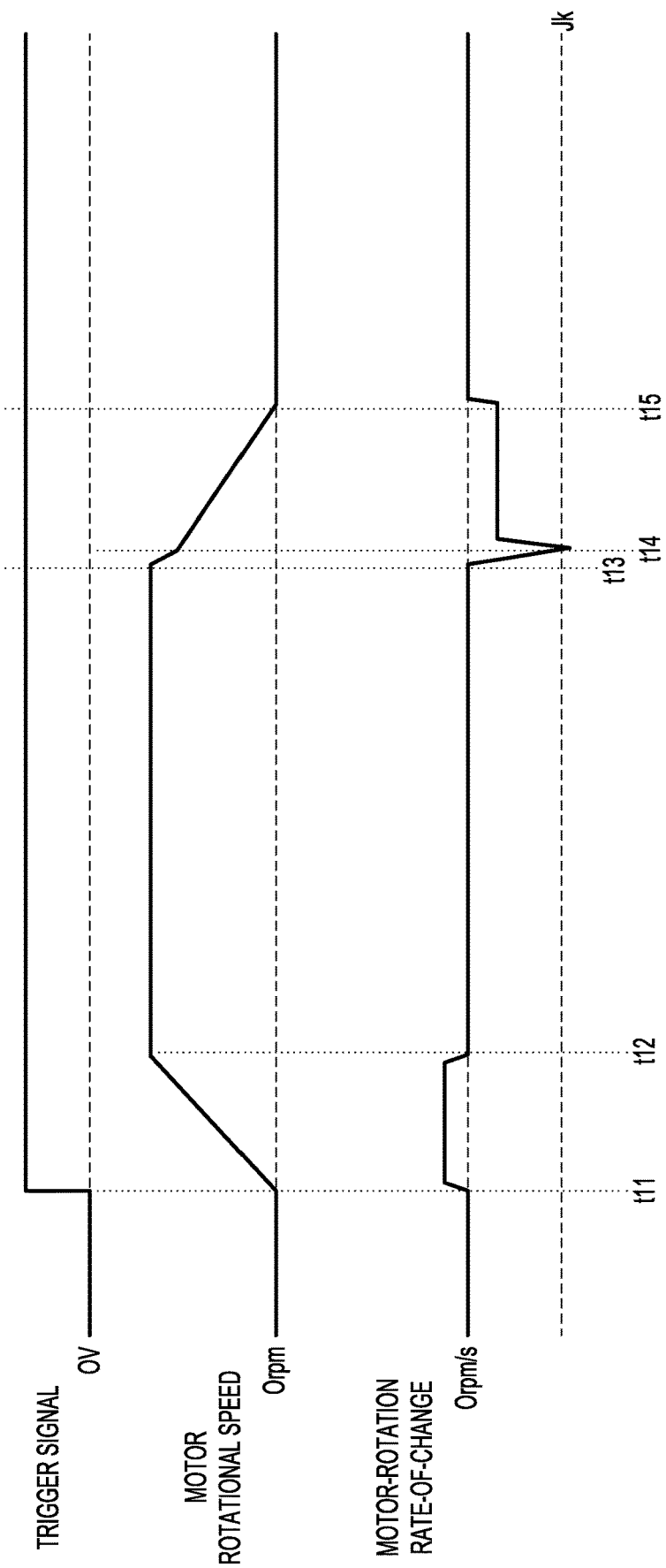
FIG. 4 is a timing chart that shows the change in motor rotational speed when an at-kickback braking process is performed.

As shown in FIG. 4, when the trigger signal switches from LOW to HI at the time t11, the control unit 20 starts the process of driving (energizing) the motor 11. Thereby, the motor rotational speed continuously (steadily) increases until the time t12, at which the motor rotational speed becomes the rotational speed that corresponds to the pulled amount of the trigger 9.

In the example shown in FIG. 4, kickback occurs at the time t13, as indicated by the abrupt drop in motor rotational speed. When the control unit 20 (or a kickback-detection part thereof) detects that the motor-rotation rate-of-change has become smaller than a kickback-determination rate-of-change Jk at the time t14, the control unit 20 starts an "at-kickback" braking process, which is defined and further described below. Thereby, the motor rotational speed continuously (steadily) decreases until the time t15, at which the motor rotational speed becomes 0 rpm, even though the trigger signal remains HI (i.e. the user may be still pulling the trigger 9 between time t14 and t15).

Next, the procedure (algorithm, protocol, instructions) for a work-machine controlling process, which is performed by the CPU 22a of the controller 22, will be explained. The work-machine controlling process is performed repetitively during the operation of the controller 22.

Figure 5:
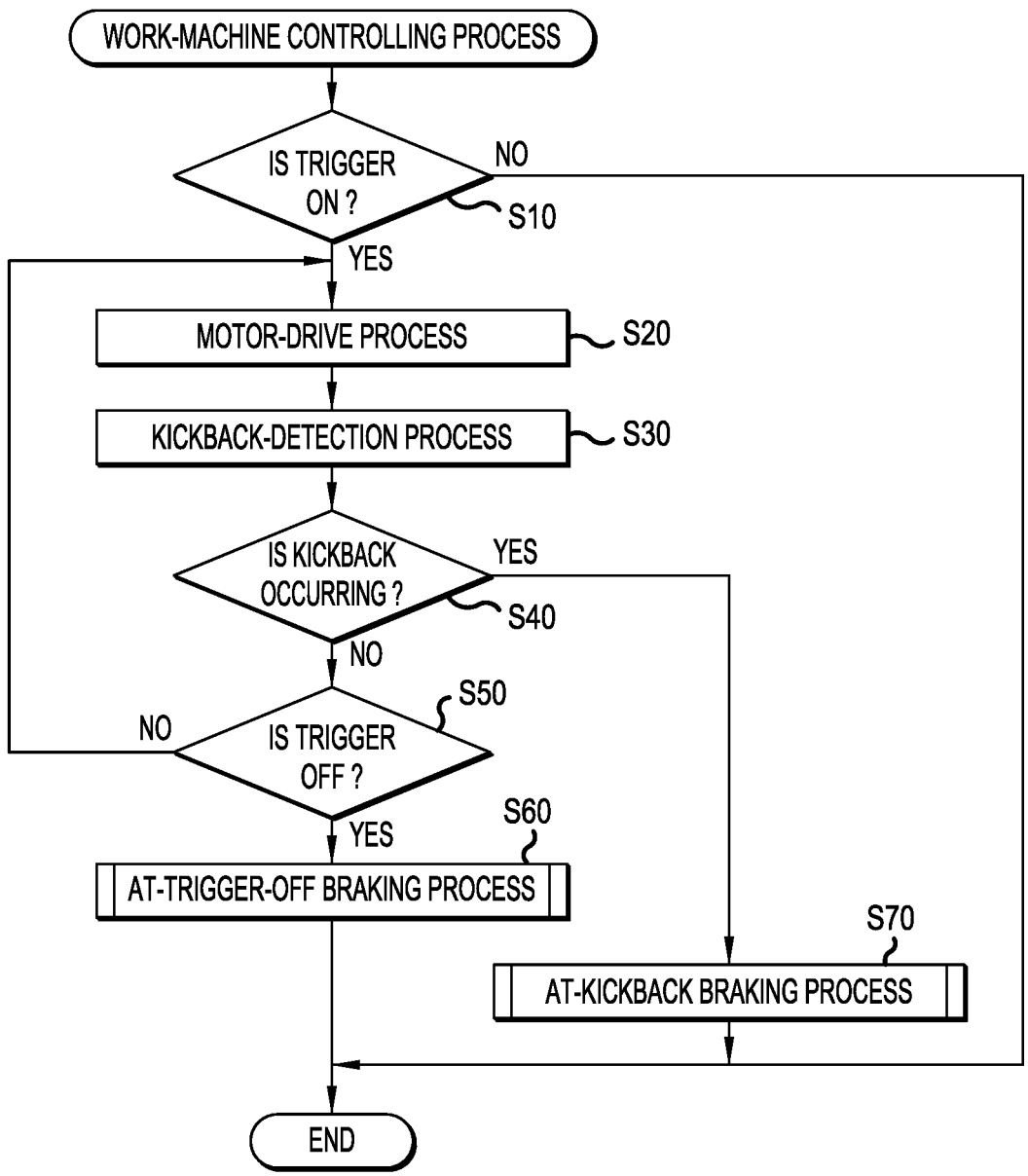
FIG. 5 is a flow chart that shows a work-machine controlling process (algorithm) according to a first embodiment of the present teachings.

When the work-machine controlling process shown in FIG. 5 is performed, the CPU 22a first determines in S10 whether the trigger 9 is in the ON state. If the trigger 9 is in the OFF state, then the CPU 22a ends the work-machine controlling process. On the other hand, if the trigger 9 is in the ON state, then the CPU 22a performs the motor-drive process in S20. In greater detail, the CPU 22a specifies electrical angles of the motor 11 based on the Hall-effect sensor signals H and, in accordance with the specified electrical angles, rotates the rotor 11a of the motor 11 by setting each of the switching devices Q1-Q6 inside the three-phase inverter 21 to the ON (current-conducting) state or the OFF (non-conducting) state so as to selectively supply electric current to the winding wire of each phase of the motor 11.

Next, in S30, the CPU 22a (or a kickback-detecting part thereof) performs a kickback-detection process. Specifically, first, the CPU 22a calculates the amount of change per unit of time of the motor rotational speed (i.e., the motor-rotation rate-of-change), i.e. a rotor deceleration value. Then, the CPU 22a determines whether the calculated motor-rotation rate-of-change is smaller than the preset kickback-determination rate-of-change (preset deceleration value) Jk. If the motor-rotation rate-of-change is smaller than the kickback-determination rate-of-change Jk, then the CPU 22a determines that kickback is occurring or has occurred. On the other hand, if the motor-rotation rate-of-change is the kickback-determination rate-of-change Jk or greater, then the CPU 22a determines that kickback is not occurring.

Then, in S40, the CPU 22a determines whether it was determined in S30 that kickback is occurring. If kickback is not occurring, then the CPU 22a determines in S50 whether the trigger 9 is in the OFF state. If the trigger 9 is not in the OFF state, then the CPU 22a proceeds to S20.

On the other hand, if the trigger 9 is in the OFF state, the CPU 22a performs the above-mentioned, below-described "at-trigger-OFF" braking process in S60. Then, when the at-trigger-OFF braking process ends, the CPU 22a ends the work-machine controlling process.

In addition, in S40, if kickback is occurring, the CPU 22a performs the above-mentioned, below-described "at-kickback" braking process in S70. Then, when the at-kickback braking process ends, the CPU 22a ends the work-machine controlling process.

Next, the procedure (algorithm, protocol, instructions) of the "at-trigger-OFF" braking process, which is performed in S60, will be explained. Herein, the term "at-trigger-OFF" is intended to mean that the CPU 22a has determined that the trigger 9 has been returned to its original position (i.e., it has been released) and thus the braking process associated with this change of state of the trigger 9 is to be performed. Thus, "at-trigger-OFF" is an abbreviation of "at the time the trigger 9 has returned to its OFF position".

Figure 6:
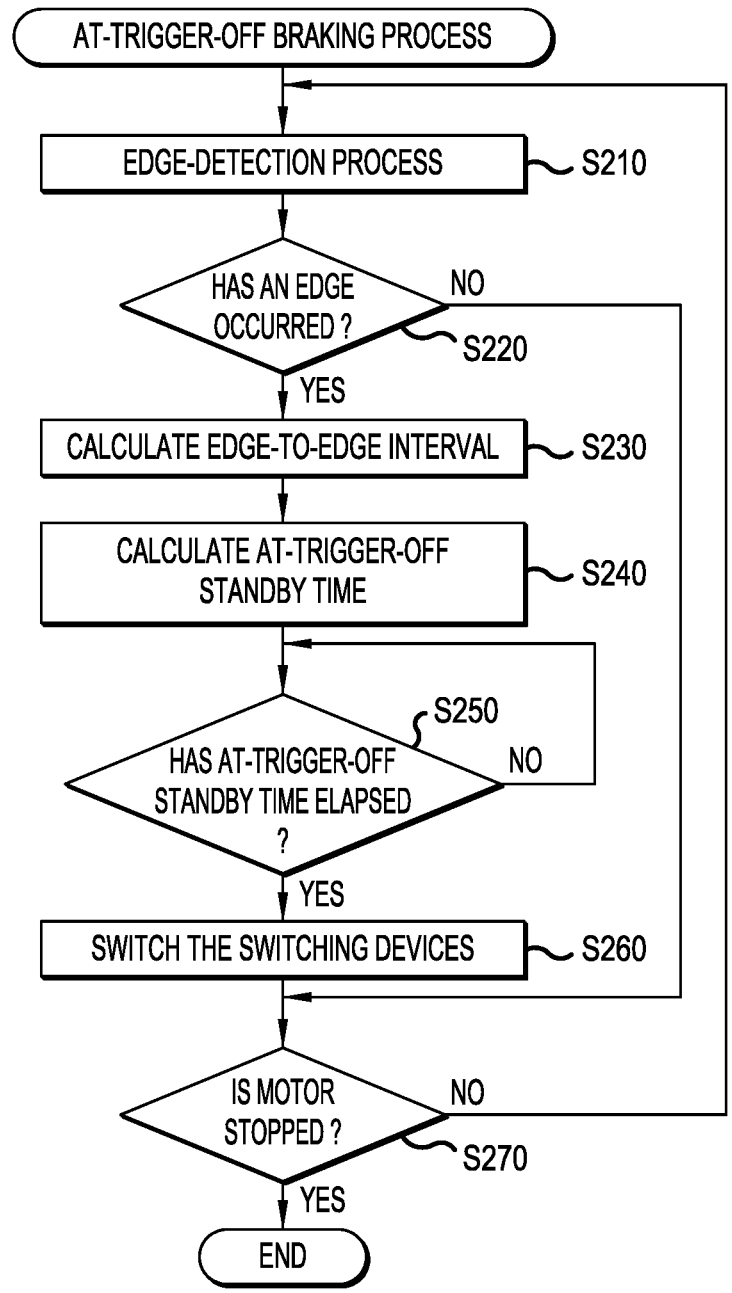
FIG. 6 is a flow chart that shows an exemplary at-trigger-OFF braking process.

When the at-trigger-OFF braking process is performed, as shown in FIG. 6, the CPU 22a first performs an edge-detection process in S210. Specifically, the CPU 22a detects whether an edge has occurred in the Hall-effect sensor signals Hu, Hv, Hw.

Then, in S220, the CPU 22a determines, based on the detection result from S210, whether an edge has occurred. If an edge has not occurred, then the CPU 22a proceeds to S270.

On the other hand, if an edge has occurred, then the CPU 22a calculates an edge-to-edge interval (time) in S230. Specifically, the CPU 22a calculates, as the edge-to-edge interval, the time difference (interval) between the current edge time, at which an edge was detected in the current edge-detection process, and the previous edge time, at which an edge was detected in the previous edge-detection process.

Then, in S240, the CPU 22a calculates an at-trigger-OFF standby time using Equation (1) below. In Equation (1), Tbn represents the at-trigger-OFF standby time, θn represents the at-trigger-OFF, braking-delay angle, and Te represents the edge-to-edge interval. In the present embodiment, the at-trigger-OFF, braking-delay angle θn is 50°.

$$Tbn = (\theta n/60°) \times Te \quad (1)$$

Next, in S250, the CPU 22a determines whether the at-trigger-OFF standby time Tbn has elapsed. If the at-trigger-OFF standby time Tbn has not yet elapsed, the CPU 22a stands by, by repetitively performing the process of S250, until the at-trigger-OFF standby time Tbn has elapsed.

Then, when the at-trigger-OFF standby time Tbn has elapsed, in S260, the CPU 22a sets the upper-stage switching devices (i.e., the switching devices Q1, Q3, Q5) to the OFF state and, based on a braking-pattern table BT stored in the ROM 22b, switches the ON/OFF state of each of the lower-stage switching devices (i.e., the switching devices Q2, Q4, Q6), and then proceeds to S270.

Having proceeded to S270, the CPU 22a determines whether the motor 11 is stopped (i.e. whether the rotor 11a is no longer rotating). If the motor 11 is not stopped, then the CPU 22a proceeds to S210. On the other hand, if the motor 11 is stopped, then the CPU 22a ends the at-trigger-OFF braking process.

Figure 7:
FIG. 7 shows a braking-pattern table according to the first embodiment.

As shown in FIG. 7, the ON/OFF state of each of the lower-stage switching devices is set in the braking-pattern table BT for a first braking period, a second braking period, a third braking period, a fourth braking period, a fifth braking period, and a sixth braking period.

The braking periods transition in the order (sequence) of the first braking period, the second braking period, the third braking period, the fourth braking period, the fifth braking period, and the sixth braking period and then it transitions back to the first braking period when the sixth braking period ends; thus, the braking periods transition repetitively in the above-described order (sequence).

The first braking period is a period in which the Hall-effect sensor signals Hu, Hv are HI and the Hall-effect sensor signal Hw is LOW. The second braking period is a period in which the Hall-effect sensor signal Hu is HI and the Hall-effect sensor signals Hv, Hw are LOW.

The third braking period is a period in which the Hall-effect sensor signals Hu, Hw are HI and the Hall-effect sensor signal Hv is LOW. The fourth braking period is a period in which the Hall-effect sensor signal Hw is HI and the Hall-effect sensor signals Hu, Hv are LOW.

The fifth braking period is a period in which the Hall-effect sensor signals Hv, Hw are HI and the Hall-effect sensor signal Hu is LOW. The sixth braking period is a period in which the Hall-effect sensor signal Hv is HI and the Hall-effect sensor signals Hu, Hw are LOW.

In the first braking period and the second braking period, the switching devices Q2, Q6 are set to the ON state and the switching device Q4 is set to the OFF state.

In the third braking period and the fourth braking period, the switching devices Q4, Q6 are set to the ON state and the switching device Q2 is set to the OFF state.

In the fifth braking period and the sixth braking period, the switching devices Q2, Q4 are set to the ON state and the switching device Q6 is set to the OFF state.

Next, the procedure (algorithm, protocol, instructions) of the "at-kickback" braking process, which is performed in S70, will be explained. Herein, the term "at-kickback" is intended to mean that the CPU 22a has determined that kickback has occurred, e.g., because the tool accessory is binding or pinching a workpiece. Thus, "at-kickback" is an abbreviation of "at the time the CPU 22a (or a kickback-detection part thereof) has determined that kickback is occurring".

Figure 8:
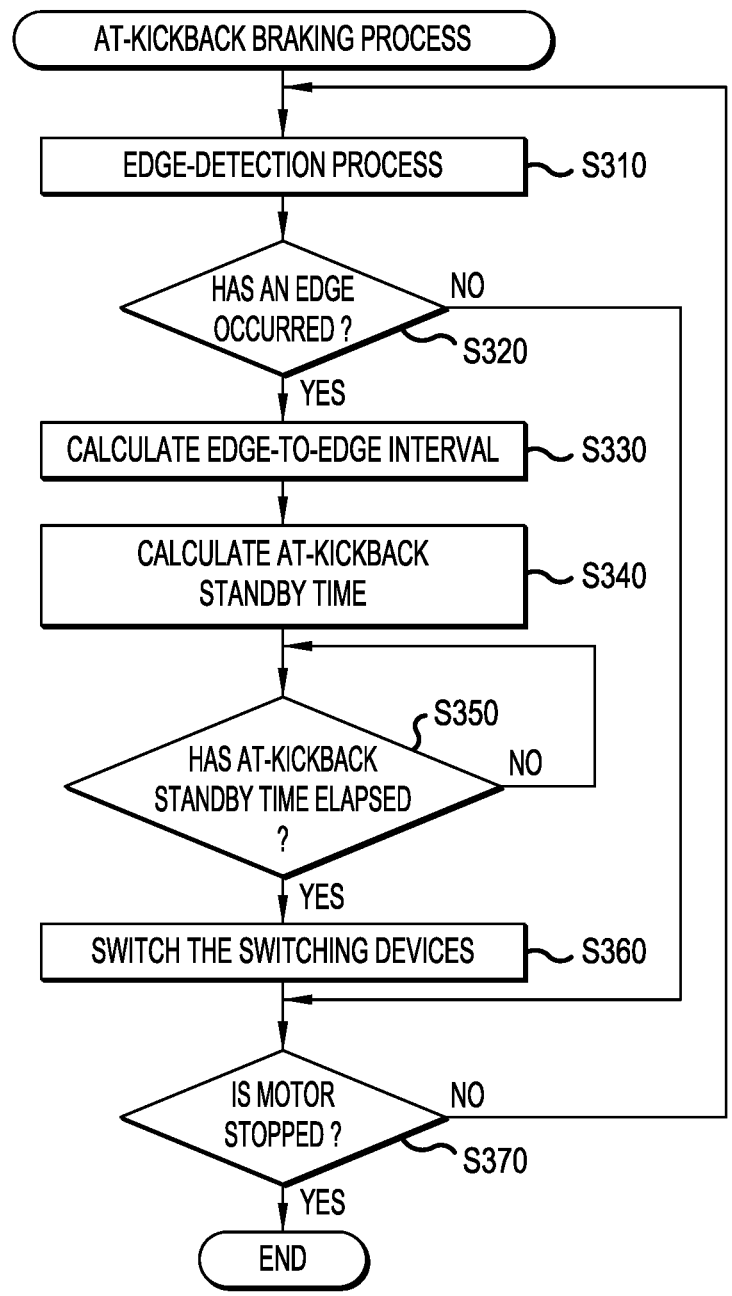
FIG. 8 is a flow chart that shows an exemplary at-kickback braking process.

When the at-kickback braking process shown in FIG. 8 is performed, the CPU 22a first performs the edge-detection process in S310, the same as in S210.

Then, in S320, the CPU 22a determines, based on the detection result from S310, whether an edge has occurred, the same as in S220. If an edge has not occurred, then the CPU 22a proceeds to S370.

On the other hand, if an edge has occurred (has been detected), the CPU 22a calculates the edge-to-edge interval (time) in S330, the same as in S230.

Then, in S340, the CPU 22a calculates an at-kickback standby time using Equation (2) below. In Equation (2), Tba represents the at-kickback standby time, θa represents the at-kickback, braking-delay angle, and Te represents the edge-to-edge interval. In the present embodiment, the at-kickback, braking-delay angle θa is 30°.

$$Tba = (\theta a/60°) \times Te \quad (2)$$

Next, in S350, the CPU 22a determines whether the at-kickback standby time Tba has elapsed. If the at-kickback standby time Tba has not yet elapsed, then the CPU 22a stands by, by repetitively performing the process of S350, until the at-kickback standby time Tba has elapsed.

Then, when the at-kickback standby time Tba has elapsed, in S360, the CPU 22a sets the upper-stage switching devices to the OFF state and, based on the braking-pattern table BT, switches the ON/OFF state of each of the lower-stage switching devices, the same as in S260, and then proceeds to S370.

Having proceeded to S370, the CPU 22a determines whether the motor 11 is stopped (i.e. whether the rotor 11a of the motor 11 has stopped rotating). If the motor 11 is not stopped, then the CPU 22a proceeds to S310. On the other hand, if the motor 11 is stopped, then the CPU 22a ends the at-kickback braking process.

Figure 9:
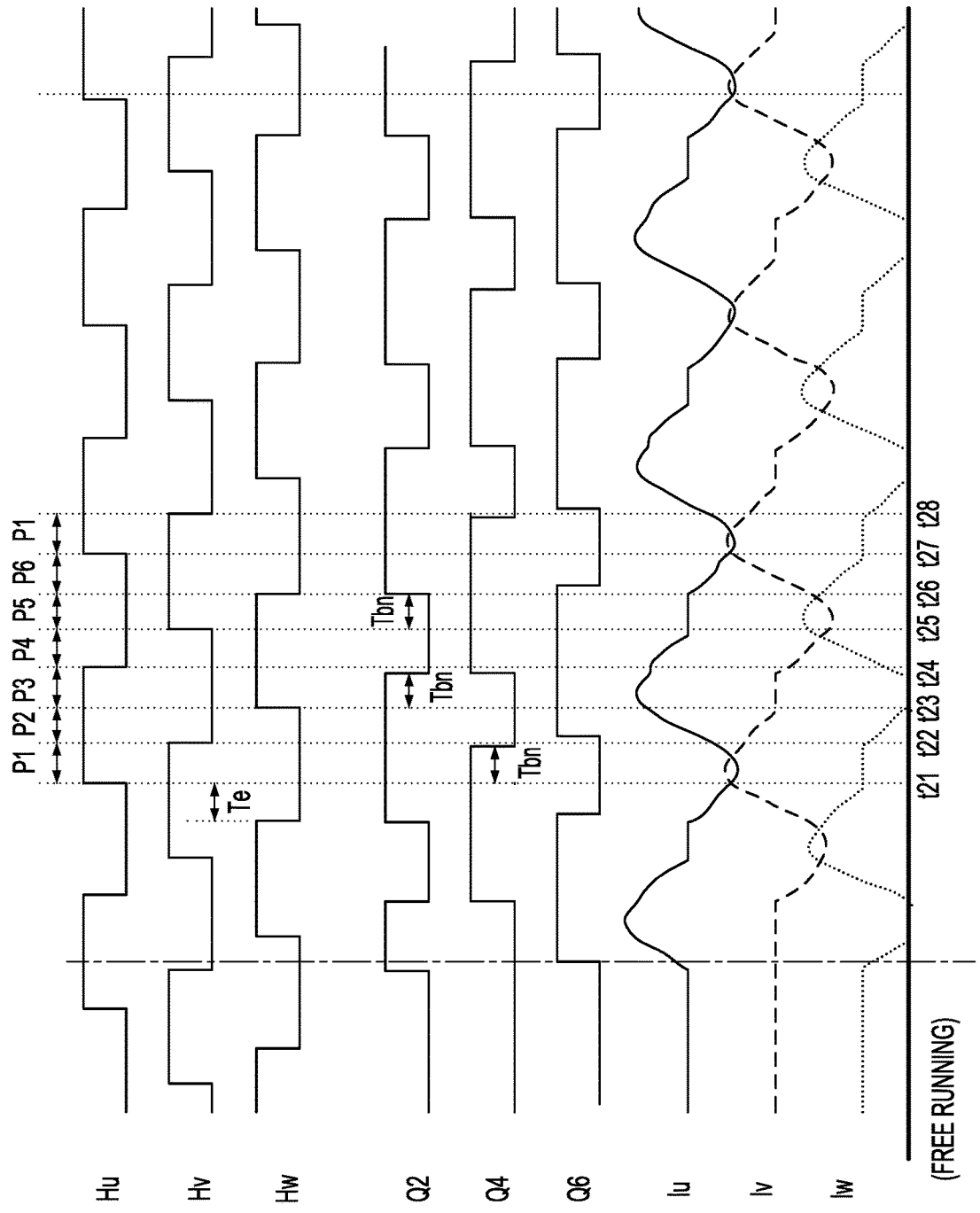
FIG. 9 is a timing chart that shows changes in Hall-effect sensor signals, etc. when the at-trigger-OFF braking process according to the first embodiment is performed.

FIG. 9 is a timing chart that shows the Hall-effect sensor signals Hu, Hv, Hw while the at-trigger-OFF braking process is being performed, the states of the switching devices Q2, Q4, Q6, and the changes in a U-phase current Iu, a V-phase current Iv, and a W-phase current Iw.

As shown in FIG. 9, the period from the time t21 to the time t22 is the first braking period P1. The period from the time t22 to the time t23 is the second braking period P2. The period from the time t23 to the time t24 is the third braking period P3. The period from the time t24 to the time t25 is the fourth braking period P4. The period from the time t25 to the time t26 is the fifth braking period P5. The period from the time t26 to the time t27 is the sixth braking period P6. The period from the time t27 to the time t28 is the first braking period P1 again.

When an edge has occurred in the Hall-effect sensor signal Hu at the time t21 and the first braking period P1 starts, the CPU 22a waits for at-trigger-OFF standby time Tbn since (after) the time t21 to elapse, and then causes the switching device Q4 to switch from the ON state to the OFF state and the switching device Q6 to switch from the OFF state to the ON state.

When an edge has occurred in the Hall-effect sensor signal Hw at the time t23 and the third braking period P3 starts, the CPU 22a waits for the at-trigger-OFF standby time Tbn since (after) the time t23 to elapse, and then causes the switching device Q2 to switch from the ON state to the OFF state and the switching device Q4 to switch from the OFF state to the ON state.

When an edge has occurred in the Hall-effect sensor signal Hv at the time t25 and the fifth braking period P5 starts, the CPU 22a waits for the at-trigger-OFF standby time Tbn since (after) the time t25 to elapse, and then causes the switching device Q6 to switch from the ON state to the OFF state and the switching device Q2 to switch from the OFF state to the ON state.

Figure 10:
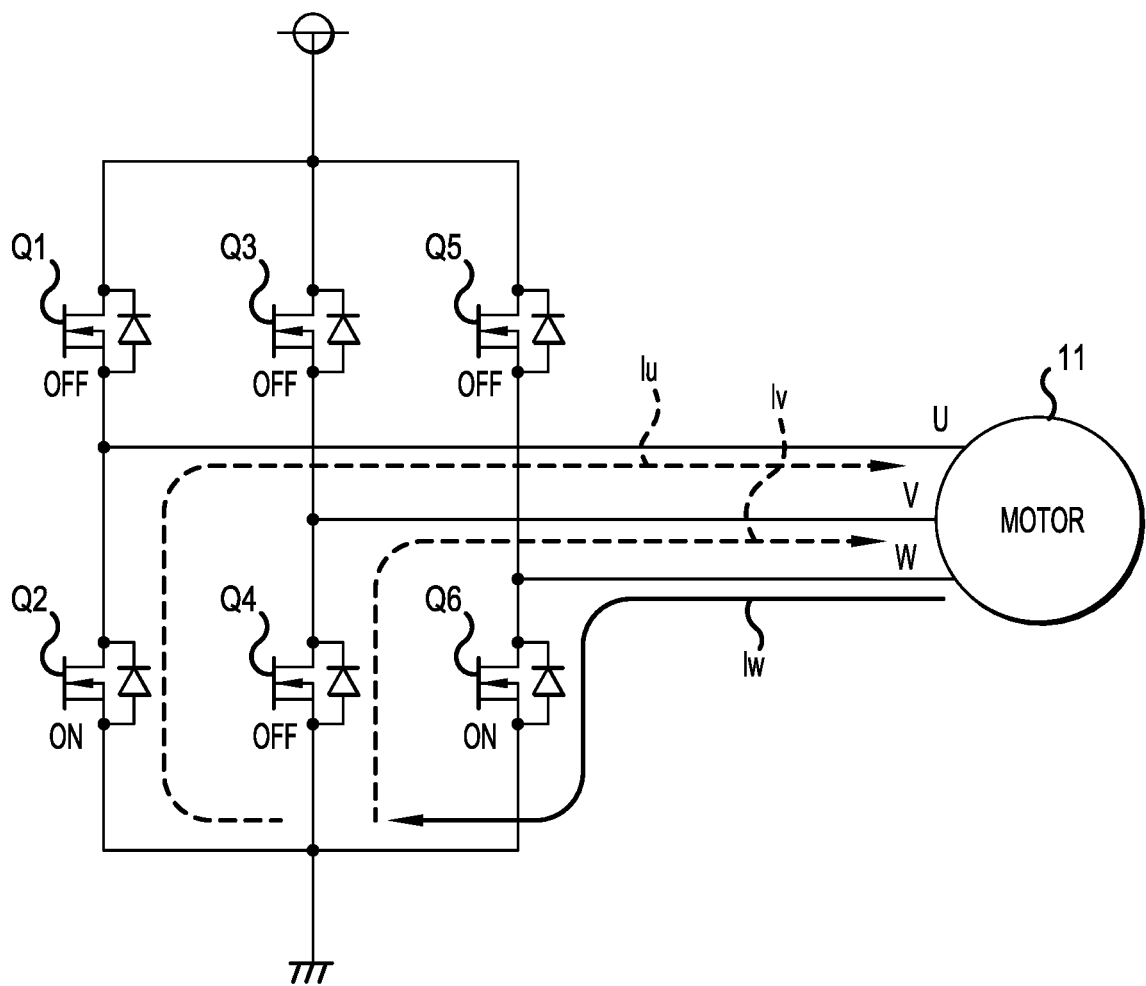
FIG. 10 shows electric-current paths when the at-trigger-OFF braking process according to the first embodiment is performed.

For example, as shown in FIG. 10, in the second braking period P2, the switching devices Q1, Q3, Q5 and the switching device Q4 are in the OFF state, and the switching devices Q2, Q6 are in the ON state. In this situation, the U-phase current Iu, which travels (flows) from ground through the switching device Q2 to the motor 11, the V-phase current Iv, which travels (flows) from ground through the switching device Q4 to the motor 11, and the W-phase current Iw, which travels (flows) from the motor 11 through the switching device Q6 to ground, are generated.

Figure 11:
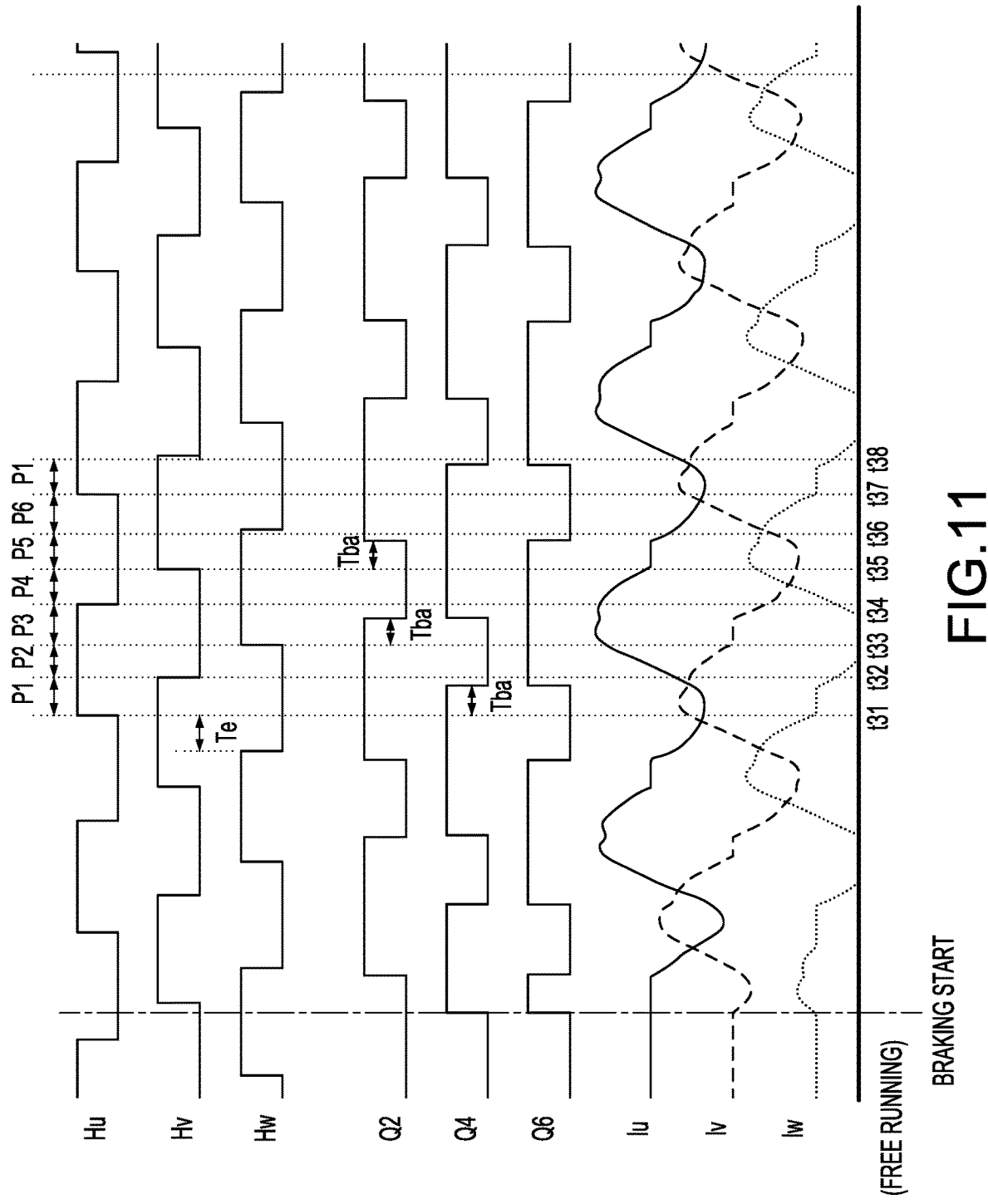
FIG. 11 is a timing chart that shows changes in the Hall-effect sensor signals, etc. when the at-kickback braking process according to the first embodiment is performed.

FIG. 11 is a timing chart that shows: the Hall-effect sensor signals Hu, Hv, Hw while the at-kickback braking process is being performed; the states of the switching devices Q2, Q4, Q6; the U-phase current Iu; the V-phase current Iv; and the W-phase current Iw.

As shown in FIG. 11, the period from the time t31 to the time t32 is the first braking period P1. The period from the time t32 to the time t33 is the second braking period P2. The period from the time t33 to the time t34 is the third braking period P3. The period from the time t34 to the time t35 is the fourth braking period P4. The period from the time t35 to the time t36 is the fifth braking period P5. The period from the time t36 to the time t37 is the sixth braking period P6. The period from the time t37 to the time t38 is the first braking period P1 again.

When an edge has occurred in the Hall-effect sensor signal Hu at the time t31 and the first braking period P1 starts, the CPU 22a waits for the at-kickback standby time Tba since (after) the time t31 to elapse, and then causes the switching device Q4 to switch from the ON state to the OFF state and the switching device Q6 to switch from the OFF state to the ON state.

When an edge has occurred in the Hall-effect sensor signal Hw at the time t33 and the third braking period P3 starts, the CPU 22a waits for the at-kickback standby time Tba since (after) the time t33 to elapse, and then causes the switching device Q2 to switch from the ON state to the OFF state and the switching device Q4 to switch from the OFF state to the ON state.

When an edge has occurred in the Hall-effect sensor signal Hv at the time t35 and the fifth braking period P5 starts, the CPU 22a waits for the at-kickback standby time Tba since (after) the time t35 to elapse, and then causes the switching device Q6 to switch from the ON state to the OFF state and the switching device Q2 to switch from the OFF state to the ON state.

The electric work machine 1 configured in this manner comprises the motor 11, the trigger 9, and the control unit 20.

The trigger 9 is manipulated by the user. When the trigger 9 is manipulated, the control unit 20 causes the motor 11 to be energized so that the rotor 11a of the motor 11 rotates.

The control unit 20 is configured to detect kickback, in which the electric work machine 1 is kicked back from the work object. The control unit 20 is also configured to perform the above-described at-kickback braking process and the above-described at-trigger-OFF braking process.

When kickback has been detected, the at-kickback braking process causes the motor 11 to generate a first (strong) braking force so as to promptly stop the rotation of the rotor 11a of the motor 11, in order to significantly reduce the likelihood of user injury and/or workpiece damage. On the other hand, when a change from a manipulated state, in which the trigger 9 is manipulated, to an unmanipulated state, in which the trigger 9 is not manipulated, has been detected, the at-trigger-OFF braking process causes the motor 11 to generate a second braking force, which is weaker than the first braking force, because it is not necessary to urgently stop the motor 11 in such a situation.

Thus, when kickback has been detected, the electric work machine 1, by causing the first braking force to be generated, can shorten the time until the rotor rotation stops. In addition, when the user stops manipulating the trigger 9, the electric work machine 1, by causing a braking force to be generated that is weaker than the situation in which kickback has occurred, can reduce the recoil generated as a result of the motor rotational speed decreasing. Owing to these features, the electric work machine 1 can shorten the time until the rotor rotation stops when kickback has occurred while also reducing the recoil generated, in response to the motor rotational speed decreasing when the user stops manipulating the trigger 9, and imparted to the user.

In addition, the motor 11 is a three-phase brushless motor. The electric work machine 1 further comprises the three-phase inverter 21, which has the switching devices Q1-Q6 and supplies three-phase alternating current to the motor 11.

Then, the at-kickback braking process causes the first braking force to be generated by switching the ON/OFF state of each of the switching devices Q1-Q6 in accordance with the motor rotational angle of the motor 11. Furthermore, the at-trigger-OFF braking process causes the second braking force to be generated by switching the ON/OFF state of each of the switching devices Q1-Q6 in accordance with the motor rotational angle. Furthermore, the motor rotational angle when the ON/OFF state of each of the switching devices Q1-Q6 is switched when the first braking force is caused to be generated and the motor rotational angle when the ON/OFF state of each of the switching devices Q1-Q6 is switched when the second braking force is caused to be generated differ from one another.

The at-kickback braking process causes the first braking force to be generated by switching the ON/OFF state of each of the switching devices Q1-Q6 at timings at which the rotor 11a of the motor 11 has rotated by the preset at-kickback, braking-delay angle θa from the timing (hereinbelow, the reference timing) at which an edge occurred in the corresponding Hall-effect sensor signals Hu, Hv, Hw. In addition, the at-trigger-OFF braking process causes the second braking force to be generated by switching the ON/OFF state of each of the switching devices Q1-Q6 at timings at which the rotor 11a of the motor 11 has rotated by the preset at-trigger-OFF, braking-delay angle θn from the reference timing. Furthermore, the at-trigger-OFF, braking-delay angle θn is greater than the at-kickback, braking-delay angle θa. Specifically, the at-kickback, braking-delay angle θa when the first braking force is caused to be generated is 30° (or more generally, in the range of 25-35°), and the at-trigger-OFF, braking-delay angle θn when the second braking force is caused to be generated is 50° (or more generally, in the range of 45-55°).

In addition, when the first braking force is caused to be generated, a ratio of the three-phase braking periods, during which the motor 11 is caused to generate a braking force by virtue of electric current being supplied to all three phases of the three-phase brushless motor 11, is greater than a ratio of such three-phase braking periods when the second braking force is caused to be generated. In addition, when the second braking force is caused to be generated, a ratio of the two-phase braking periods, during which a braking force is caused to be generated by virtue of electric current being supplied to only two of the three phases of the three-phase brushless motor 11, is greater than a ratio of such two-phase braking periods when the first braking force is caused to be generated.

As shown in FIG. 11, when the at-kickback braking process is performed to cause the first braking force to be generated, the U-phase current Iu, the V-phase current Iv, and the W-phase current Iw are continuously supplied during the second, fourth, and sixth braking periods P2, P4, P6. On the other hand, a W-phase nonconducting period, during which the W-phase current Iw is not supplied (i.e., 0 A), exists in the first braking period P1. In addition, a V-phase nonconducting period, during which the V-phase current Iv is not being supplied, exists in the third braking period P3. A U-phase nonconducting period, during which the U-phase current Iu is not being supplied, exists in the fifth braking period P5.

As shown in FIG. 9, when the at-trigger-OFF braking process is performed to cause the second braking force to be generated, the U-phase current Iu, the V-phase current Iv, and the W-phase current Iw are continuously supplied during the second, fourth, and sixth braking periods P2, P4, P6. On the other hand, a W-phase nonconducting period exists in the first braking period P1. A V-phase nonconducting period exists in the third braking period P3. A U-phase nonconducting period exists in the fifth braking period P5.

Furthermore, the U-phase, V-phase, and W-phase nonconducting periods in FIG. 11 are shorter than the U-phase, V-phase, and W-phase nonconducting periods in FIG. 9, respectively. That is, a ratio of the three-phase braking periods during which the at-kickback braking process is performed (i.e. during which braking current is supplied to the motor) is greater than a ratio of the three-phase braking periods during which the at-trigger-OFF braking process is performed (i.e. during which braking current is supplied to the motor). In addition, a ratio of the two-phase braking periods during which the at-trigger-OFF braking process is performed is greater than a ratio of the two-phase braking periods during which the at-kickback braking process is performed.

Figure 12:
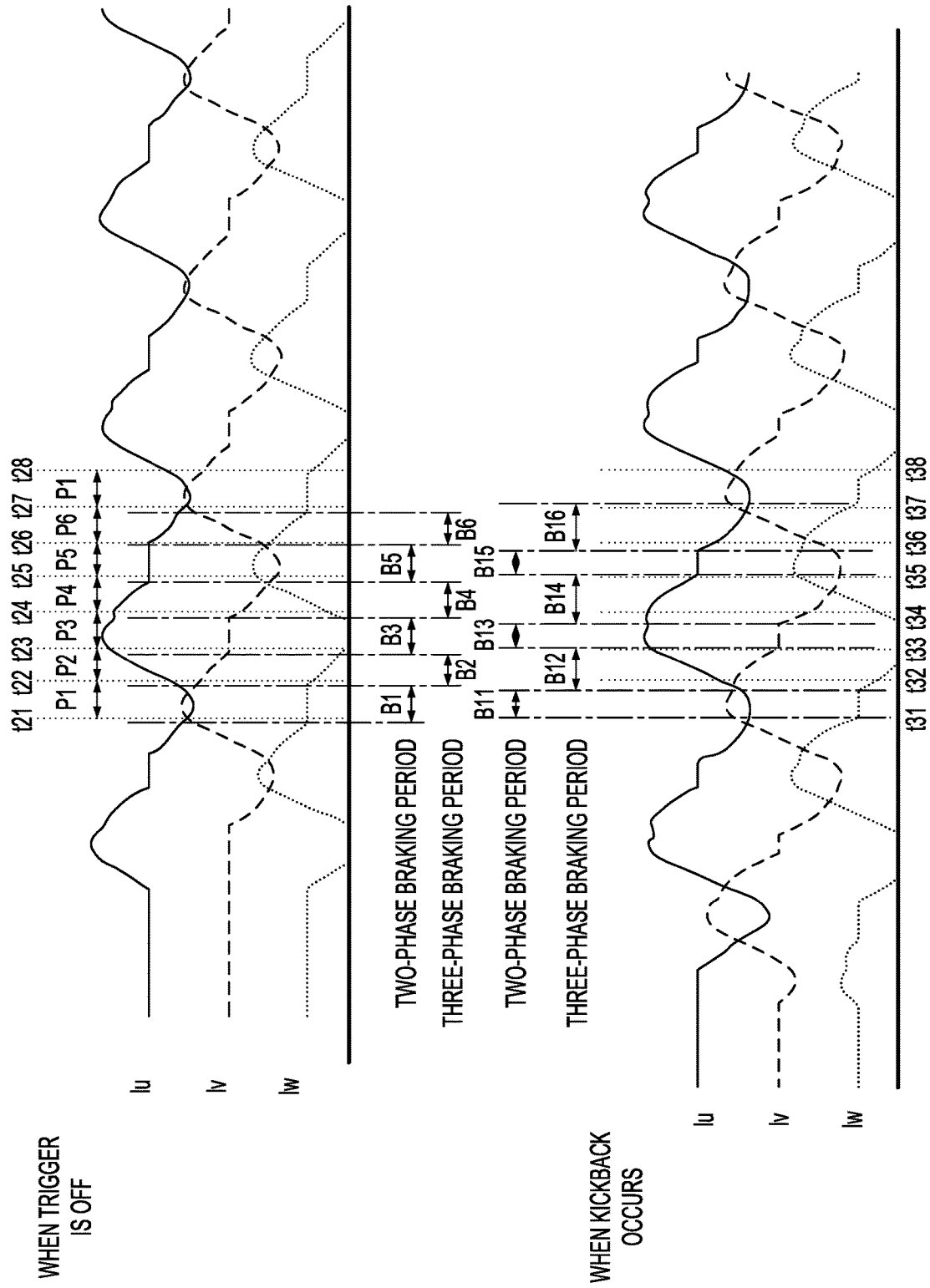
FIG. 12 shows two-phase braking periods and three-phase braking periods according to the first embodiment.

As shown in FIG. 12, the three-phase braking periods B12, B14, B16 when the at-kickback braking process is performed are longer than the three-phase braking periods B2, B4, B6 when the at-trigger-OFF braking process is performed. Consequently, in the period from the first braking period P1 to the sixth braking period P6, the percentage of the three-phase braking periods (i.e. during which braking current is supplied to the motor) when the at-kickback braking process is performed is greater than when the at-trigger-OFF braking process is performed.

In addition, the two-phase braking periods B1, B3, B5 when the at-trigger-OFF braking process is performed are longer than the two-phase braking periods B11, B13, B15 when the at-kickback braking process is performed. Consequently, in the period from the first braking period P1 to the sixth braking period P6, a ratio of the two-phase braking periods a ratio of the two-phase braking periods when the at-trigger-OFF braking process is performed is greater than when the at-kickback braking process is performed.

In the first embodiment as explained above, the trigger 9 corresponds to a manipulatable part, S10, S20, and S40-S70 each correspond to a process that serves as a control part, and S30 corresponds to a process that, when executed by the CPU 22a, serves as a kickback-detection part.

In addition, S60 corresponds to a first braking control, S70 corresponds to a second braking control, and the three-phase inverter 21 corresponds to an inverter.

Second Embodiment

A second embodiment of the present disclosure will be explained below, with reference to the drawings. It is noted that, in the second embodiment, only portions that differ from those in the first embodiment will be explained. Structural elements in common are assigned identical symbols.

Figure 13:
FIG. 13 shows the braking-pattern table according to a second embodiment of the present teachings.

The electric work machine 1 of the second embodiment differs from that of the first embodiment in that the braking-pattern table BT has been modified, as shown in FIG. 13.

That is, in the first braking period, the switching device Q2 is set to the ON state and the switching devices Q4, Q6 are set to the OFF state. In the second braking period, the switching devices Q2, Q6 are set to the ON state and the switching device Q4 is set to the OFF state.

In the third braking period, the switching device Q6 is set to the ON state and the switching devices Q2, Q4 are set to the OFF state. In the fourth braking period, the switching devices Q4, Q6 are set to the ON state and the switching device Q2 is set to the OFF state.

In the fifth braking period, the switching device Q4 is set to the ON state and the switching devices Q2, Q6 are set to the OFF state. In the sixth braking period, the switching devices Q2, Q4 are set to the ON state and the switching device Q6 is set to the OFF state.

Figure 14:
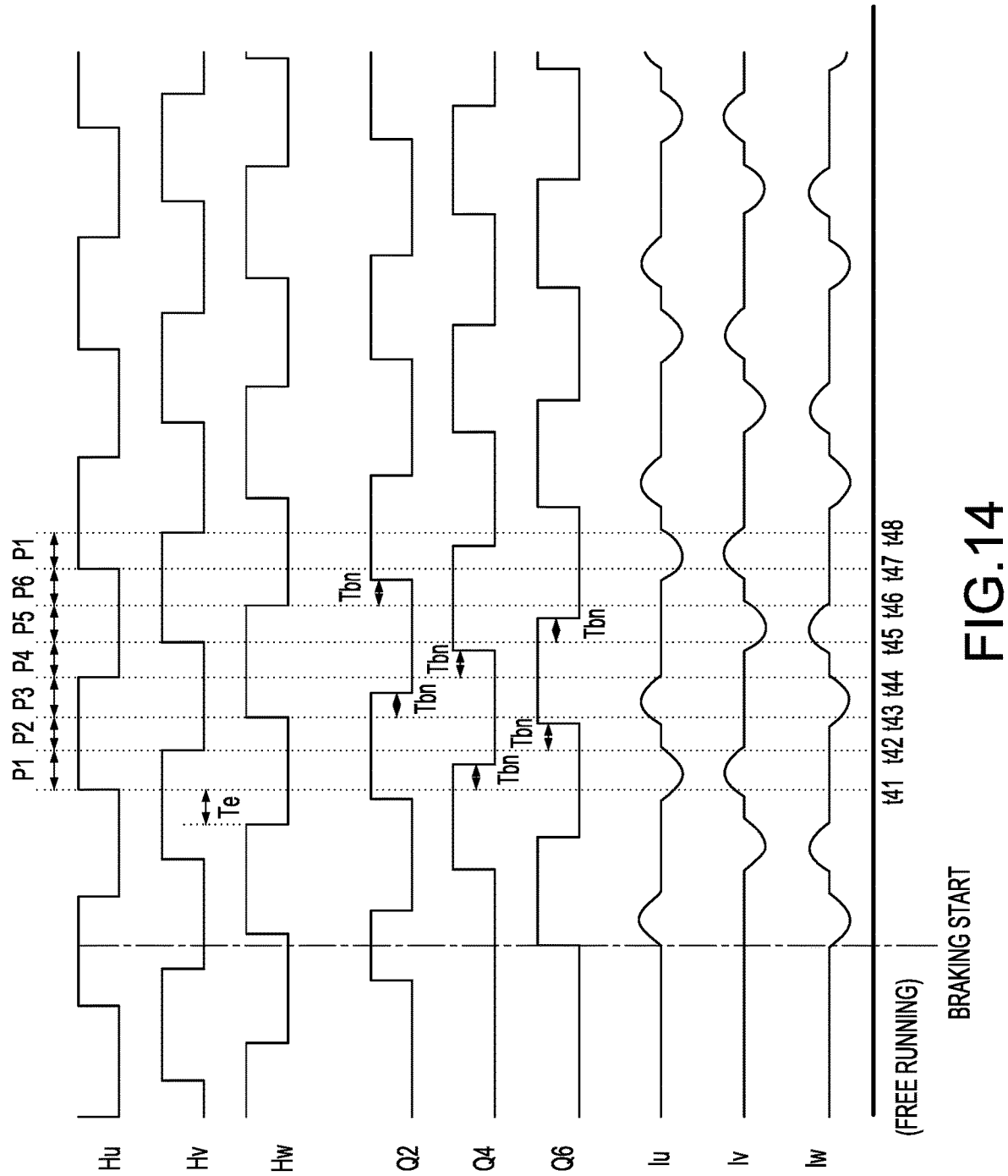
FIG. 14 is a timing chart that shows changes in the Hall-effect sensor signals, etc. when the at-trigger-OFF braking process according to the second embodiment is performed.

FIG. 14 is a timing chart that shows: the Hall-effect sensor signals Hu, Hv, Hw when the at-trigger-OFF braking process of the second embodiment is performed; the states of the switching devices Q2, Q4, Q6; the U-phase current Iu; the V-phase current Iv; and the W-phase current Iw.

As shown in FIG. 14, the period from the time t41 to the time t42 is the first braking period P1. The period from the time t42 to the time t43 is the second braking period P2. The period from the time t43 to the time t44 is the third braking period P3. The period from the time t44 to the time t45 is the fourth braking period P4. The period from the time t45 to the time t46 is the fifth braking period P5. The period from the time t46 to the time t47 is the sixth braking period P6. The period from the time t47 to the time t48 is the first braking period P1.

When an edge occurs in the Hall-effect sensor signal Hu at the time t41 and the first braking period P1 starts, the CPU 22a waits for the at-trigger-OFF standby time Tbn since (after) the time t41 to elapse, and then causes the switching device Q4 to switch from the ON state to the OFF state.

When an edge occurs in the Hall-effect sensor signal Hv at the time t42 and the second braking period P2 starts, the CPU 22a waits for the at-trigger-OFF standby time Tbn since (after) the time t42 to elapse, and then causes the switching device Q6 to switch from the OFF state to the ON state.

When an edge occurs in the Hall-effect sensor signal Hw at the time t43 and the third braking period P3 starts, the CPU 22a waits for the at-trigger-OFF standby time Tbn since (after) the time t43 to elapse, and then causes the switching device Q2 to switch from the ON state to the OFF state.

When an edge occurs in the Hall-effect sensor signal Hu at the time t44 and the fourth braking period P4 starts, the CPU 22a waits for the at-trigger-OFF standby time Tbn since (after) the time t44 to elapse, and then causes the switching device Q4 to switch from the OFF state to the ON state.

When an edge occurs in the Hall-effect sensor signal Hv at the time t45 and the fifth braking period P5 starts, the CPU 22a waits for the at-trigger-OFF standby time Tbn since (after) the time t45 to elapse, and then causes the switching device Q6 to switch from the ON state to the OFF state.

When an edge occurs in the Hall-effect sensor signal Hw at the time t46 and the sixth braking period P6 starts, the CPU 22a waits for the at-trigger-OFF standby time Tbn since (after) the time t46 to elapse, and then causes the switching device Q2 to switch from the OFF state to the ON state.

Figure 15:
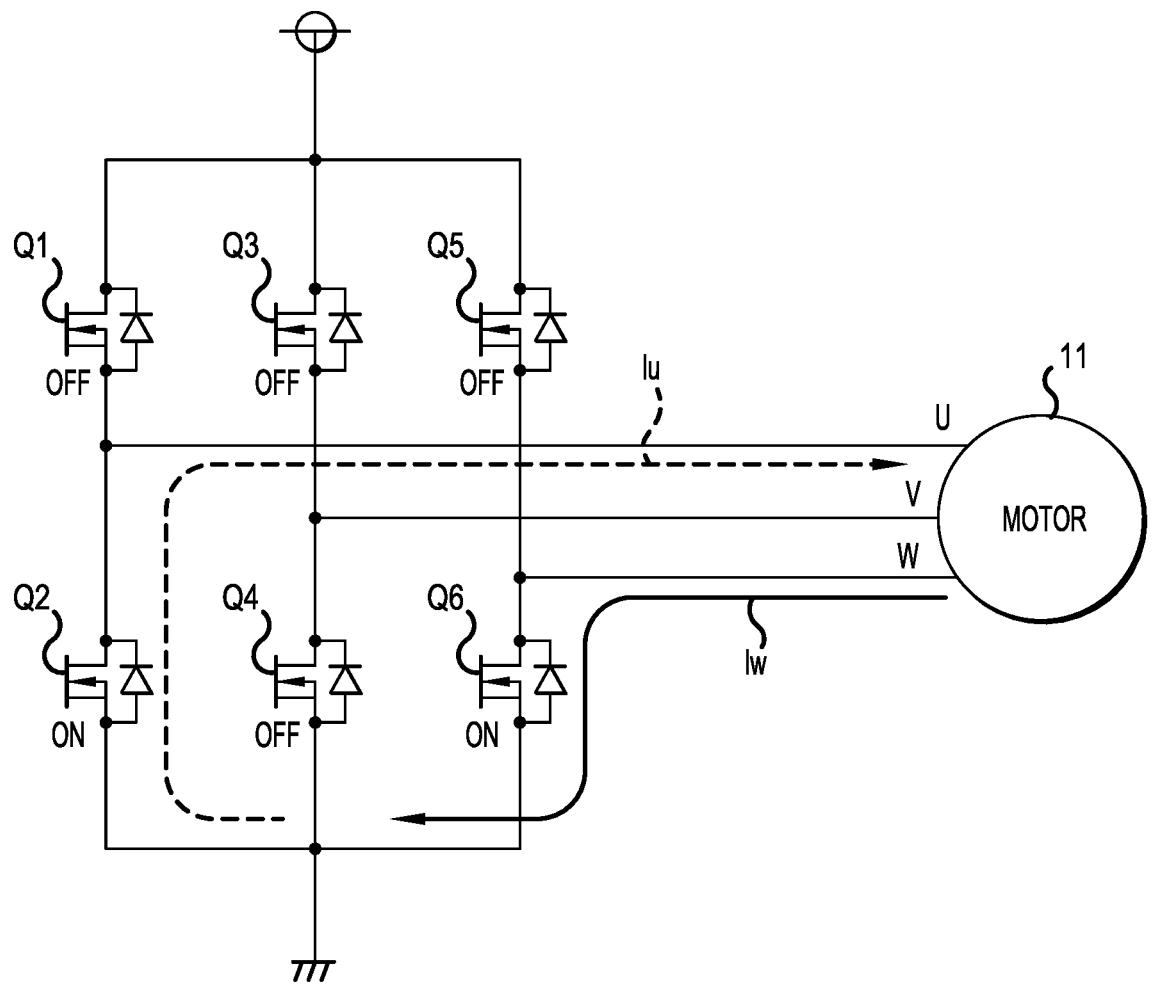
FIG. 15 shows the electric-current paths when the at-trigger-OFF braking process according to the second embodiment is performed.

For example, as shown in FIG. 15, in the third braking period P3, the switching devices Q1, Q3, Q5 and the switching device Q4 are in the OFF state and the switching devices Q2, Q6 are in the ON state. In this situation, the U-phase current Iu, which travels (flows) from ground through the switching device Q2 to the motor 11, and the W-phase current Iw, which travels (flows) from the motor 11 through the switching device Q6 to ground, are generated.

Figure 16:
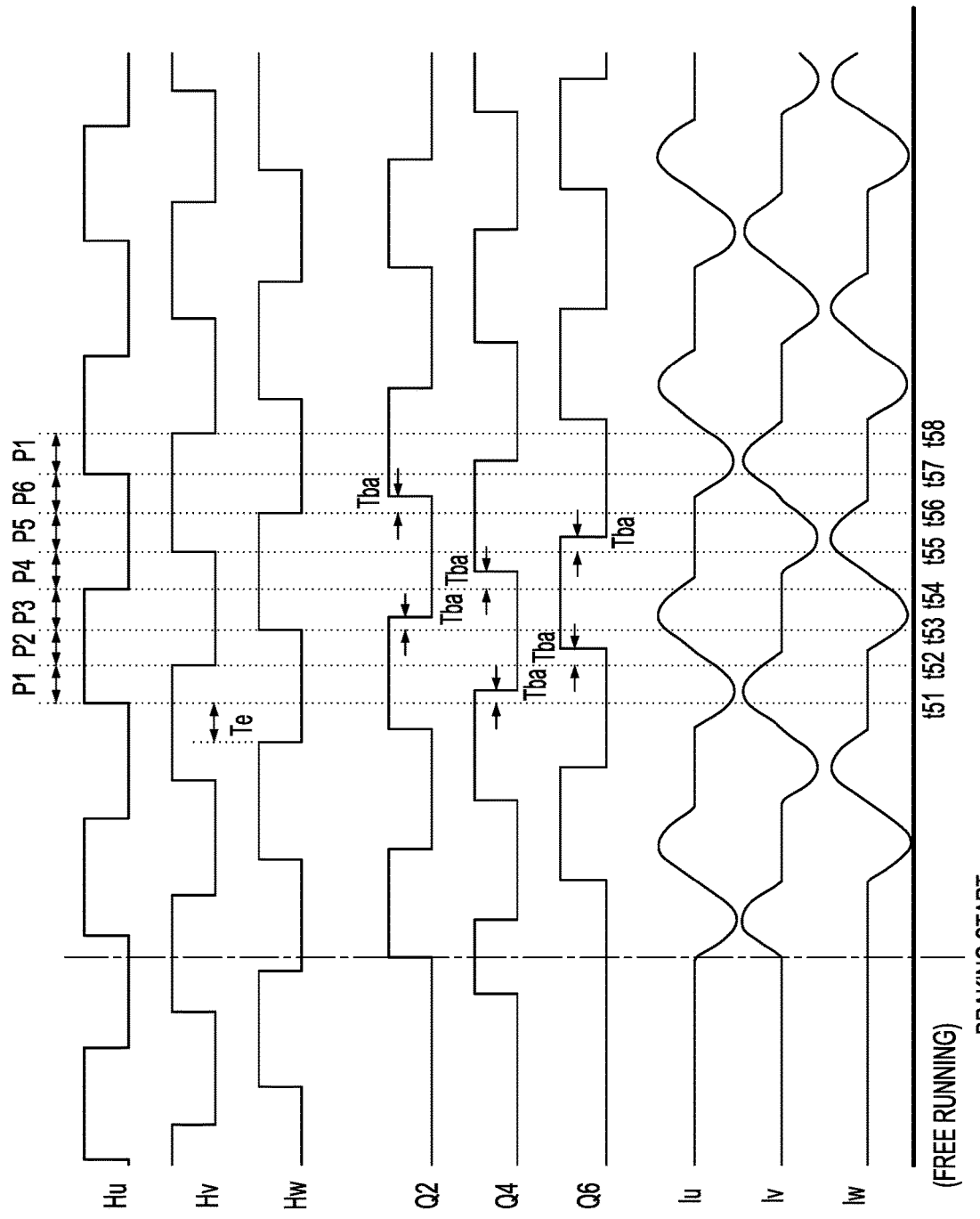
FIG. 16 is a timing chart that shows changes in the Hall-effect sensor signals, etc. when the at-kickback braking process according to the second embodiment is performed.

FIG. 16 is a timing chart that shows: the Hall-effect sensor signals Hu, Hv, Hw when the at-kickback braking process of the second embodiment is performed; the states of the switching devices Q2, Q4, Q6; the U-phase current Iu; the V-phase current Iv; and the W-phase current Iw.

As shown in FIG. 16, the period from the time t51 to the time t52 is the first braking period P1. The period from the time t52 to the time t53 is the second braking period P2. The period from the time t53 to the time t54 is the third braking period P3. The period from the time t54 to the time t55 is the fourth braking period P4. The period from the time t55 to the time t56 is the fifth braking period P5. The period from the time t56 to the time t57 is the sixth braking period P6. The period from the time t57 to the time t58 is the first braking period P1.

When an edge occurs in the Hall-effect sensor signal Hu at the time t51 and the first braking period P1 starts, the CPU 22a waits for the at-kickback standby time Tba since (after) the time t51 to elapse, and then causes the switching device Q4 to switch from the ON state to the OFF state.

When an edge occurs in the Hall-effect sensor signal Hv at the time t52 and the second braking period P2 starts, the CPU 22a waits for the at-kickback standby time Tba since (after) the time t52 to elapse, and then causes the switching device Q6 to switch from the OFF state to the ON state.

When an edge occurs in the Hall-effect sensor signal Hw at the time t53 and the third braking period P3 starts, the CPU 22a waits for the at-kickback standby time Tba since (after) the time t53 to elapse, and then causes the switching device Q2 to switch from the ON state to the OFF state.

When an edge occurs in the Hall-effect sensor signal Hu at the time t54 and the fourth braking period P4 starts, the CPU 22a waits for the at-kickback standby time Tba since (after) the time t54 to elapse, and then causes the switching device Q4 to switch from the OFF state to the ON state.

When an edge occurs in the Hall-effect sensor signal Hv at the time t55 and the fifth braking period P5 starts, the CPU 22a waits for the at-kickback standby time Tba since (after) the time t55 to elapse, and then causes the switching device Q6 to switch from the ON state to the OFF state.

When an edge occurs in the Hall-effect sensor signal Hw at the time t56 and the sixth braking period P6 starts, the CPU 22a waits for the at-kickback standby time Tba since (after) the time t56 to elapse, and then causes the switching device Q2 to switch from the OFF state to the ON state.

With regard to the electric work machine 1 configured in this manner, when the first braking force is caused to be generated, a ratio of the two-phase braking periods, during which the motor 11 is caused to generate the braking force by virtue of electric current being supplied to only two of the three phases of the three-phase brushless motor 11, is greater than a ratio of such two-phase braking periods when the second braking force is caused to be generated. In addition, when the second braking force is caused to be generated, a ratio of the brake-OFF periods, during which the braking force is caused to be generated by virtue of electric current not being supplied to all three phases of the three-phase brushless motor 11, is larger than a ratio of such brake-OFF periods when the first braking force is caused to be generated.

When the at-trigger-OFF braking process is performed to cause the second braking force to be generated, as shown in FIG. 14, electric current is continuously supplied to two of the three phases in the first, third, and fifth braking periods P1, P3, P5. On the other hand, nonconducting periods for all phases, in which the U-phase current Iu, the V-phase current Iv, and the W-phase current Iw are not supplied, exist in the second, fourth, and sixth braking periods P2, P4, P6.

When the at-kickback braking process is performed to cause the first braking force to be generated, as shown in FIG. 16, electric current is continuously supplied to two of the three phases in the first, third, and fifth braking periods P1, P3, P5. On the other hand, in the second, fourth, and sixth braking periods P2, P4, P6, nonconducting periods for all phases either do not exist or, even if they do exist, are extremely short.

That is, a ratio of the two-phase braking periods when the at-kickback braking process is performed is larger than a ratio of the two-phase braking periods when the at-trigger-OFF braking process is performed. In addition, a ratio of the brake-OFF periods when the at-trigger-OFF braking process is performed is greater than a ratio of the brake-OFF periods when the at-kickback braking process is performed.

Figure 17:
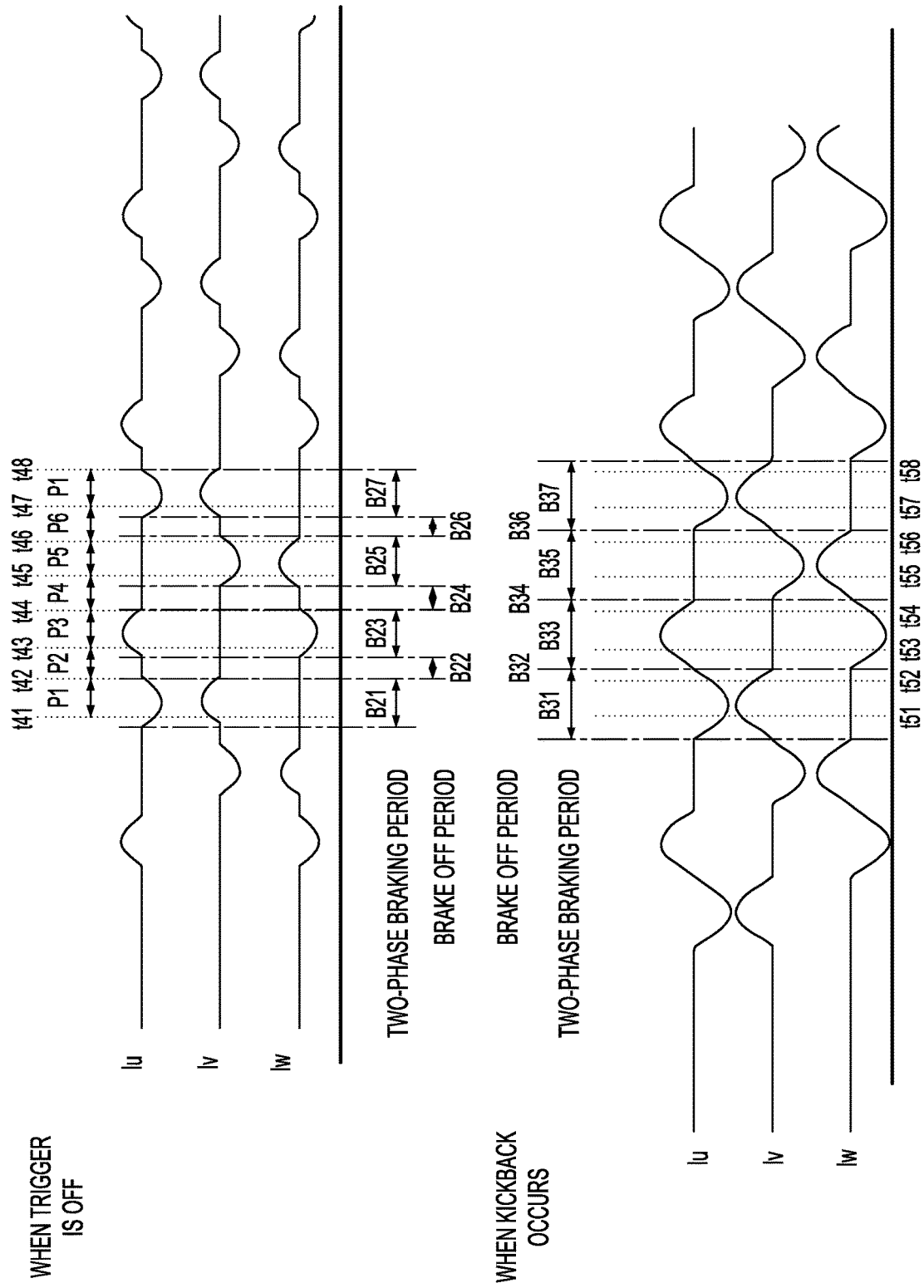
FIG. 17 shows the two-phase braking periods and brake-OFF periods according to the second embodiment.

As shown in FIG. 17, the two-phase braking periods B31, B33, B35, B37 when the at-kickback braking process is performed are longer than the two-phase braking periods B21, B23, B25, B27 when the at-trigger-OFF braking process is performed. Consequently, in the period from the first braking period P1 to the sixth braking period P6, a ratio of the two-phase braking periods when the at-kickback braking process is performed is greater than, a ratio of the two-phase braking periods when the at-trigger-OFF braking process is performed.

In addition, the brake-OFF period B32 when the at-kickback braking process is performed is an extremely short time in which the transition is made from the two-phase braking period B31 to the two-phase braking period B33. Likewise, the brake-OFF periods B34, B36 are extremely short times in which transitions are made from the two-phase braking periods B33, B35 to the two-phase braking periods B35, B37, respectively.

Accordingly, the brake-OFF periods B22, B24, B26 when the at-trigger-OFF braking process is performed are longer than the brake-OFF periods B32, B34, B36 when the at-kickback braking process is performed. Consequently, in the period from the first braking period P1 to the sixth braking period P6, the percentage of the brake-OFF periods when the at-trigger-OFF braking process is performed is greater than when the at-kickback braking process is performed.

Third Embodiment

A third embodiment of the present disclosure will be explained below, with reference to the drawings. It is noted that, in the third embodiment, only portions that differ from those of the first embodiment will be explained. Structural elements in common are assigned identical symbols.

The electric work machine 1 of the third embodiment differs from that of the first embodiment in that the work-machine controlling process is modified.

Figure 18:
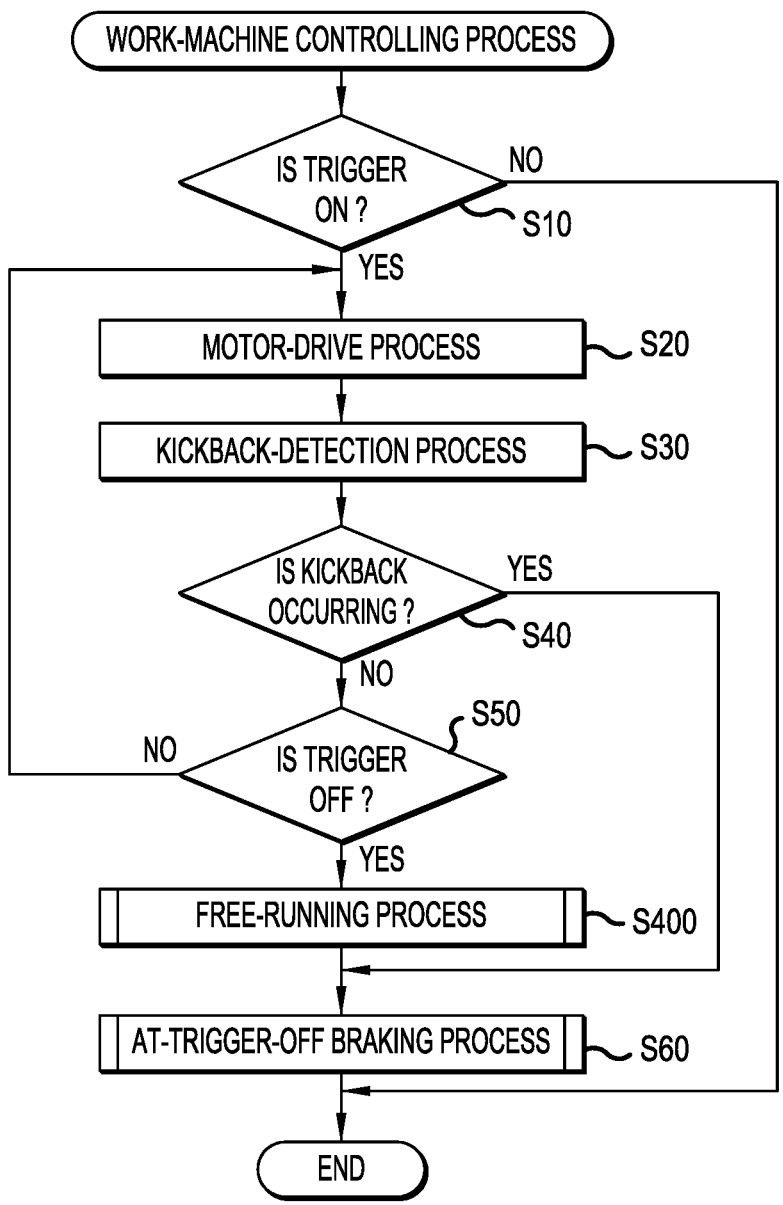
FIG. 18 is a flow chart that shows the work-machine controlling process (algorithm) according to a third embodiment of the present teachings.

As shown in FIG. 18, the work-machine controlling process of the third embodiment differs from that of the first embodiment in that the process of S70 is omitted and in that the process of S400 is added.

That is, in S40, when kickback is occurring or has occurred, the CPU 22a proceeds to S60.

In addition, in S50, when the trigger 9 is in the OFF state, the CPU 22a performs a free-running process, which is described below, in S400 and then proceeds to S60.

Here, the procedure (algorithm, protocol, instructions) of the free-running process, which is performed in S400, will be explained. Herein, the term "free-running" is intended to mean that the rotor 11a of the motor 11 is permitted to continue to rotate under its own inertia without applying any braking.

Figure 19:
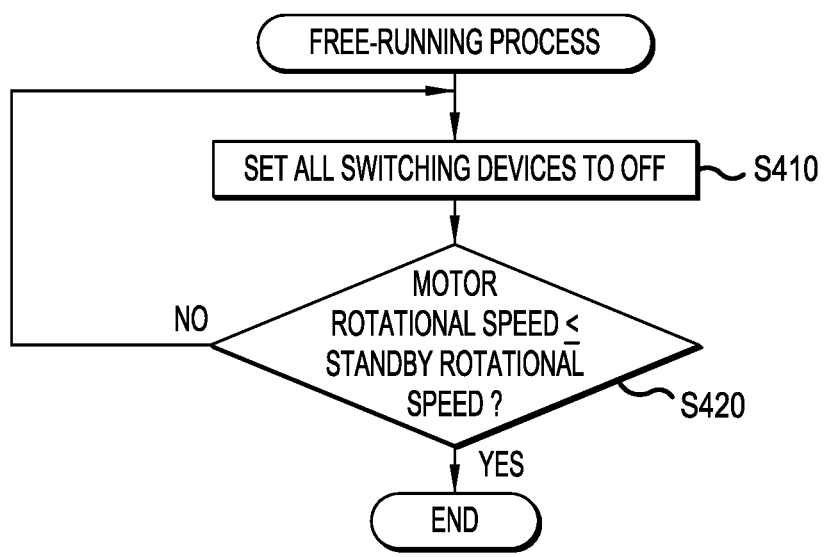
FIG. 19 is a flow chart that shows a free-running process according to the third embodiment.

When the free-running process is performed, as shown in FIG. 19, the CPU 22a first sets the switching devices Q1-Q6 to the OFF state in S410. Then, in S420, the CPU 22a determines whether the motor rotational speed is a preset standby (threshold) rotational speed Je or less.

If the motor rotational speed is greater than the standby rotational speed Je, then the CPU 22a proceeds to S410. On the other hand, if the motor rotational speed is the standby rotational speed Je or less, then the CPU 22a ends the free-running process.

Figure 20:
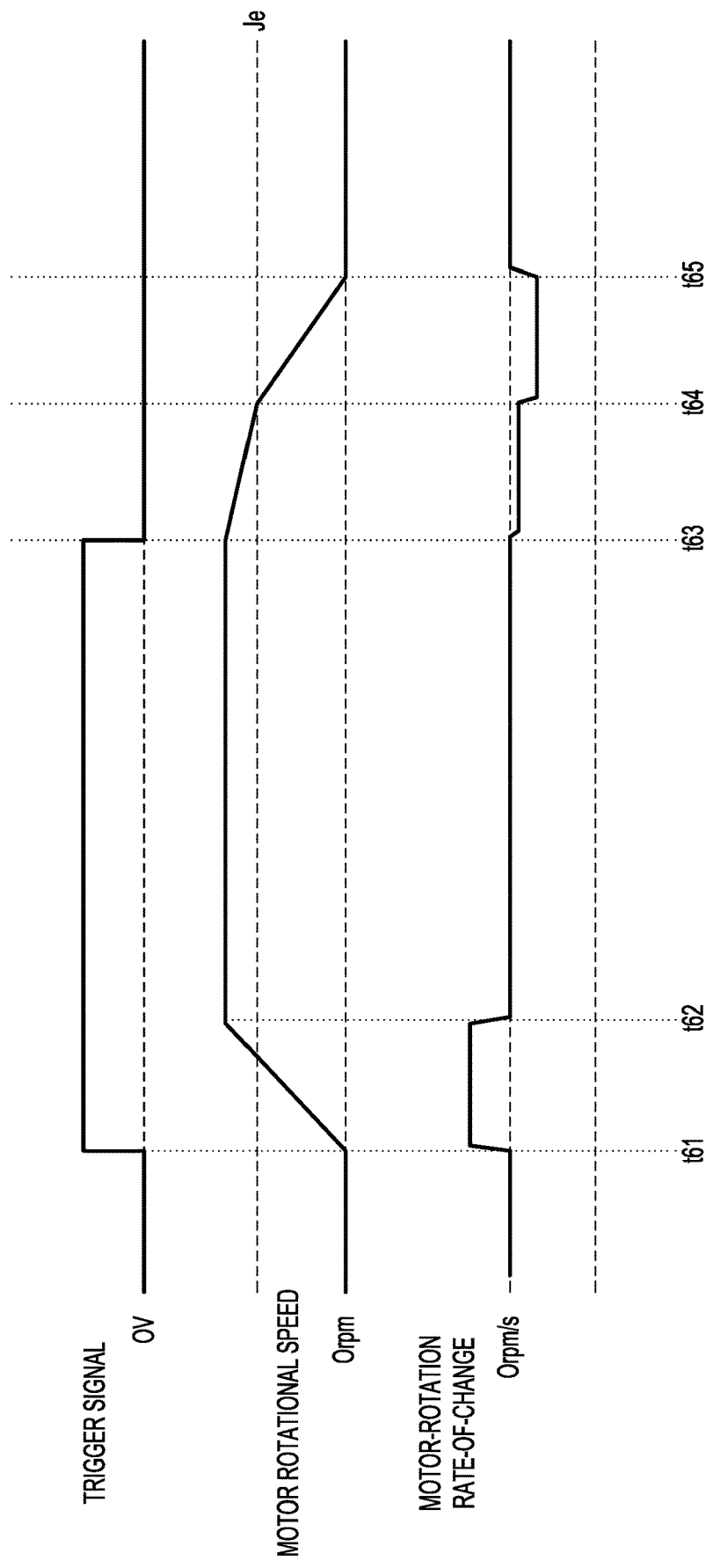
FIG. 20 is a timing chart that shows changes in the motor rotational speed when the free-running process according to the third embodiment is performed.

As shown in FIG. 20, when the trigger signal switches from LOW to HI at the time t61, the control unit 20 starts the process of driving (energizing) the motor 11. Thereby, the motor rotational speed continuously (steadily) increases until the time t62, at which the motor rotational speed becomes the rotational speed that corresponds to the pulled amount of the trigger 9.

Subsequently, when the trigger signal switches from HI to LOW at the time t63, the control unit 20 starts the free-running process. Thereby, the motor rotational speed continuously (steadily) decreases because internal friction impedes the rotation of the rotor 11a.

Then, when the motor rotational speed becomes the standby (threshold) rotational speed Je or less at the time t64, the control unit 20 starts the at-trigger-OFF braking process. Thereby, the motor rotational speed continuously (steadily) decreases until the time t65, at which the motor rotational speed becomes 0 rpm. Thus, the rate of deceleration of the rotor 11a is increased when the at-trigger-OFF braking process is performed as compared to when the free-running process is performed.

The electric work machine 1 configured in this manner comprises the motor 11, the trigger 9, and the control unit 20.

Immediately after kickback has been detected, the processes of S40 and S60 cause the motor 11 to generate a braking force to stop the rotation of the motor 11. In the situation in which a change in the trigger 9 from the manipulated state to the unmanipulated state has been detected, after the motor rotational speed of the motor 11 has become the standby rotational speed Je or less, the processes of S410, S420, and S60 cause a braking force to be generated.

Thus, in the situation in which kickback has occurred, the electric work machine 1, by causing a braking force to be generated immediately thereafter, can shorten the time until the motor rotation stops. In addition, when the user stops manipulating the trigger 9, the electric work machine 1, by causing a braking force to be generated after the rotational speed of the motor 11 becomes the standby rotational speed Je or less, can curtail a sudden (abrupt, large) drop in the motor rotational speed and thereby can reduce the recoil generated owing to the motor rotational speed decreasing. Owing to these features, the electric work machine 1 can shorten the time until the motor rotation stops when kickback occurs and, when the user stops manipulating the trigger 9, can reduce the recoil generated, owing to the motor rotational speed decreasing, and imparted to the user.

In the embodiment as explained above, S40 and S60 correspond to a fifth braking control, S410, S420, and S60 correspond to a sixth braking control, and the standby rotational speed Je corresponds to a prescribed (threshold) rotational speed.

Fourth Embodiment

A fourth embodiment of the present disclosure will be explained below, with reference to the drawings. It is noted that, in the fourth embodiment, only portions that differ from those of the third embodiment will be explained. Structural elements in common are assigned identical symbols.

The electric work machine 1 of the fourth embodiment differs from that of the third embodiment in that the free-running process is modified.

In the following, the procedure of the free-running process of the fourth embodiment will be explained.

Figure 21:
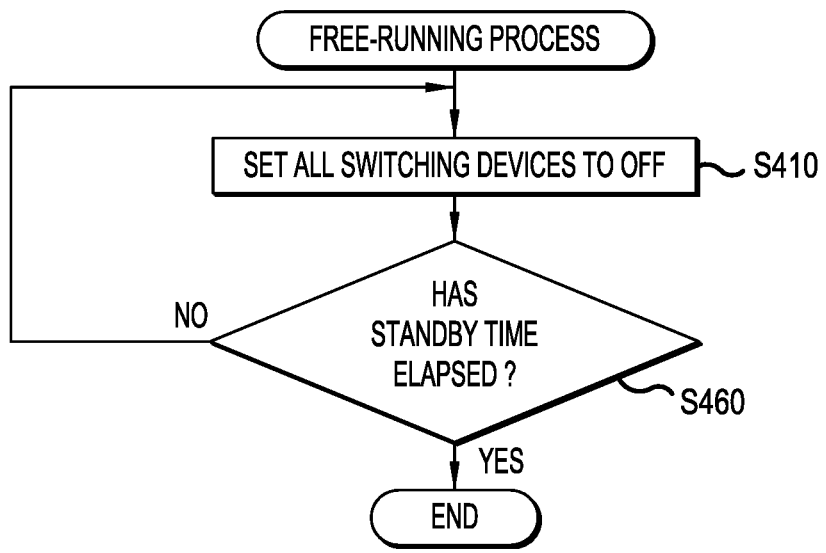
FIG. 21 is a flow chart that shows the free-running process according to a fourth embodiment of the present teachings.

When the free-running process of the fourth embodiment is performed, as shown in FIG. 21, first, in S410, the CPU 22a sets the switching devices Q1-Q6 to the OFF state. Then, in S460, the CPU 22a starts the OFF state of each of the switching devices Q1-Q6 and then determines whether a preset standby time Te has elapsed.

If the standby time Te has not elapsed, then the CPU 22a proceeds to S410. On the other hand, if the standby time Te has elapsed, then the CPU 22a ends the free-running process.

Figure 22:
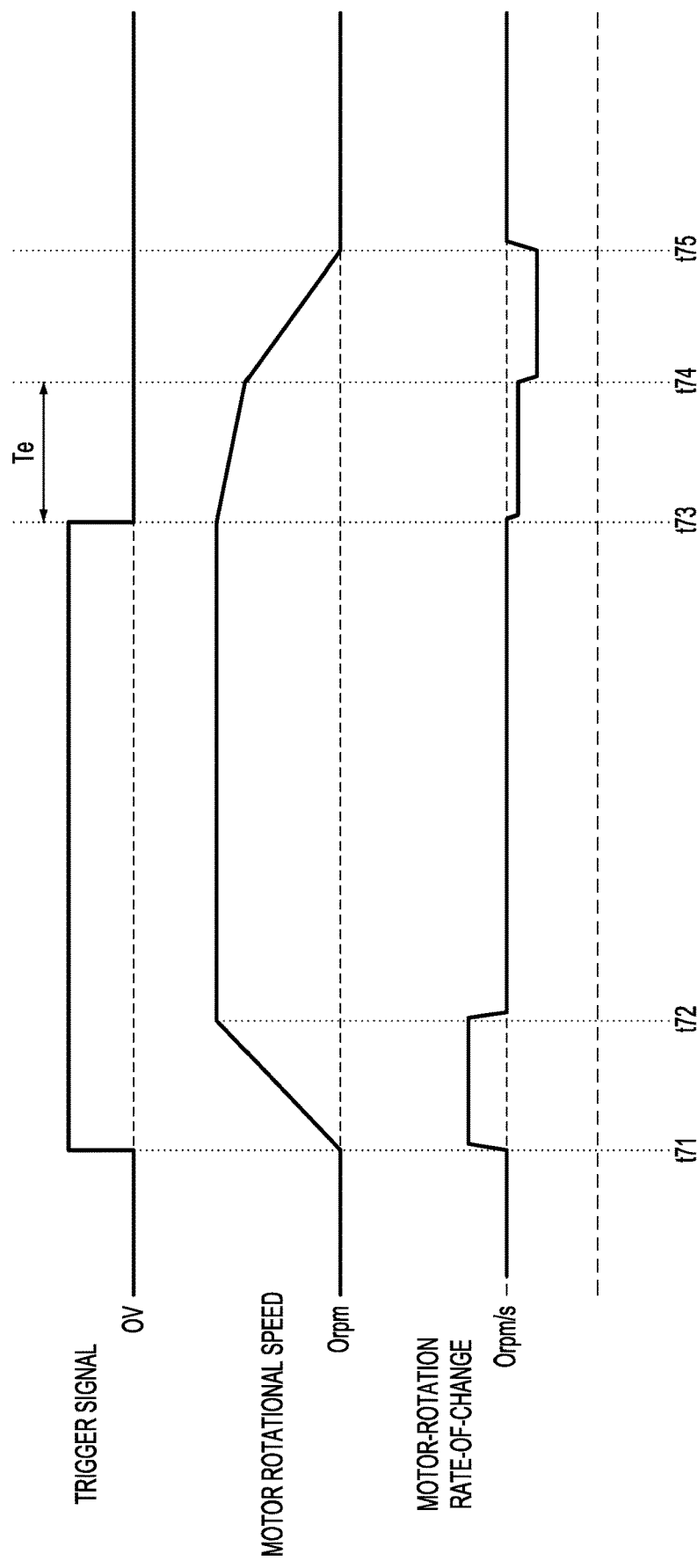
FIG. 22 is a timing chart that shows changes in the motor rotational speed when the free-running process according to the fourth embodiment is performed.

As shown in FIG. 22, when the trigger signal switches from LOW to HI at the time t71, the control unit 20 starts the process of driving (energizing) the motor 11. Thereby, the motor rotational speed continuously (steadily) increases until the time t72, at which the motor rotational speed becomes the rotational speed that corresponds to the pulled amount of the trigger 9.

Subsequently, when the trigger signal switches from HI to LOW at the time t73, the control unit 20 starts the free-running process. Thereby, the motor rotational speed continuously (steadily) decreases because internal friction impedes the rotation of the rotor 11a.

Then, when the standby time Te has elapsed at the time t74, the control unit 20 starts the at-trigger-OFF braking process. Thereby, the motor rotational speed continuously (steadily) decreases at a faster (higher) rate-of-change until the time t75, at which the motor rotational speed becomes 0 rpm. Thus, similar to the third embodiment, the rate of deceleration of the rotor 11a is increased when the at-trigger-OFF braking process is performed as compared to when the free-running process is performed.

The electric work machine 1 configured in this manner comprises the motor 11, the trigger 9, and the control unit 20.

Immediately after kickback has been detected, the processes of S40 and S60 cause the motor 11 to generate a braking force to stop the rotation of the rotor 11a of the motor 11. Furthermore, when a change in the trigger 9 from the manipulated state to the unmanipulated state has been detected, after the standby time Te has elapsed, the processes of S410, S460, and S60 cause a braking force to be generated.

Thus, when kickback has occurred, the electric work machine 1, by causing a braking force to be generated immediately thereafter, can shorten the time until the motor rotation stops. In addition, when the user stops manipulating the trigger 9, the electric work machine 1, by causing a braking force to be generated after the standby time Te has elapsed, can avoid a sudden (abrupt, sharp) decrease in the motor rotational speed and thereby can reduce the recoil generated as a result of the motor rotational speed decreasing. Owing to these features, the electric work machine 1 can reduce the time until the motor rotation stops when kickback occurs and, when the user stops manipulating the trigger 9, can reduce the recoil generated (in response to the motor rotational speed decreasing) and imparted to the user.

In the third embodiment as explained above, S40 and S60 correspond to a third braking control, and S410, S460, and S60 correspond to a fourth braking control.

Embodiments of the present disclosure were explained above, but the present disclosure is not limited to the above-mentioned embodiments, and a variety of modifications can be effected.

For example, in the above-described embodiments, an aspect is described in which the motor rotational angle when the ON/OFF state of each of the switching devices Q1-Q6 is changed differs between the situation in which the first braking force is caused to be generated and the situation in which the second braking force is caused to be generated. However, it may be configured such that the first braking force is caused to be generated using at least three-phase, short-circuit braking and such that the second braking force is caused to be generated using at least two-phase, short-circuit braking.

Figure 23:
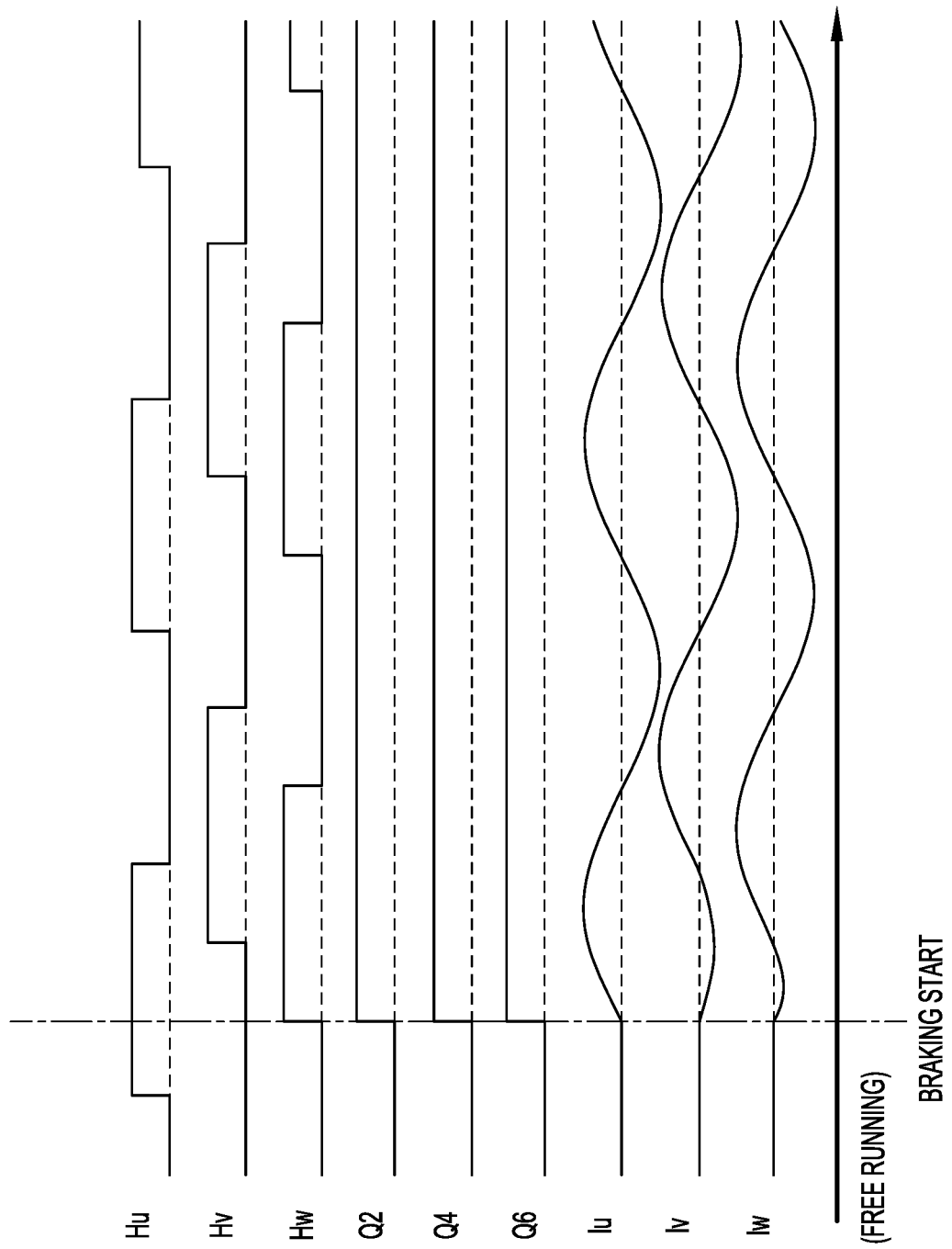
FIG. 23 is a timing chart that shows changes in the Hall-effect sensor signals, etc. when three-phase, short-circuit braking is performed.

In three-phase, short-circuit braking, the motor 11 is caused to generate a braking force by short circuiting the three terminals of the three-phase brushless motor. In three-phase, short-circuit braking, the braking force can be caused to be generated by, for example, setting the switching devices Q1, Q3, Q5 to the OFF state and by, for example, as shown in FIG. 23, setting the switching devices Q2, Q4, Q6 to the ON state.

In two-phase, short-circuit braking, the motor 11 is caused to generate a braking force by short circuiting two of the terminals of the three-phase brushless motor. In two-phase, short-circuit braking, the braking force can be caused to be generated by, for example, setting the switching devices Q1, Q3, Q5 to the OFF state and by, for example, as shown in FIG. 9, setting two of the switching devices Q2, Q4, Q6 to the ON state.

The techniques of the present disclosure can be applied to a variety of electric work machines such as, for example, grinders, chainsaws, rotary hammers, driver-drills, table saws, miter saws, band saws, etc. Thus, for tools that do not have a trigger, such as grinders, table saws, miter saws, band saws, etc., the manipulatable part may be, e.g., a slide switch or a toggle switch.

A plurality of functions having a single structural element in the embodiments above may be implemented by a plurality of structural elements, and a single function having a single structural element may be implemented by a plurality of structural elements. In addition, a plurality of functions having a plurality of structural elements may be implemented by a single structural element, and a single function implemented by a plurality of structural elements may be implemented by a single structural element. In addition, a portion of the configuration of each embodiment above may be omitted. In addition, at least a portion of the configuration of each embodiment above may be supplemented or substituted by the configuration of other embodiments above.

In addition to the electric work machine 1 described above, the present teachings can also be implemented in various modes such as: a program for causing a computer to function as the control unit 20; a nonvolatile, physical recording medium, such as semiconductor memory, that stores the program; a tool-controlling method; and the like.

In the above-described embodiments, kickback was detected by detecting the rate-of-change of the rotor rotation, which may be performed, e.g., by analyzing the signals output by the Hall sensor unit 15. In an alternative embodiment, kickback may be detected using an accelerometer that detects an abrupt movement (sudden acceleration) of the body of the electric work machine 1. The accelerometer may be mounted, e.g., on the same circuit board as the CPU 22a and may be electrically connected to the CPU 22a. The CPU 22a may be configured to analyze signals from the accelerometer in order to assess whether kickback has occurred. Thereafter, the at-kickback braking process or the at-trigger-OFF braking process may be performed in accordance with the above-described embodiments.

Although some aspects of the present disclosure have been described in the context of a device, it is to be understood that these aspects also represent a description of a corresponding method, so that each block, part or component of a device, such as the control part 20 or CPU 22*a*, is also understood as a corresponding method step or as a feature of a method step. In an analogous manner, aspects which have been described in the context of or as a method step also represent a description of a corresponding block, part, detail, algorithm or feature of a corresponding device, such as the control part 20 or CPU 22*a*.

Depending on certain implementation requirements, exemplary embodiments of the control part 20 or CPU 22*a* of the present disclosure may be implemented in hardware and/or in software. The implementation can be configured using a digital storage medium (non-transitory computer-readable medium), for example one or more of a ROM, a PROM, an EPROM, an EEPROM or a flash memory, on which electronically readable control signals (program code—computer-readable instructions) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control part 20 or CPU 22*a*, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes in the control part 20 or CPU 22*a*.

Therefore, although some aspects of the control part 20 or CPU 22*a* may have been identified as "parts" or "steps", it is understood that such parts or steps need not be physically separate or distinct electrical components, but rather may be different blocks of program code that are executed by the same hardware component, e.g., one or more microprocessors.

Although the above-described embodiments are each battery-driven (cordless) power tools, the present teachings are also applicable to corded power tools that receive alternating current from a commercial power supply (mains power).

Additional embodiments of the present teachings include, but are not limited to:

1. An electric work machine, such as an electric power tool, comprising:
   an electric motor;
   a manipulatable part, such as a trigger, a slide switch or a toggle switch, configured to be manually manipulated by a user;
   a microprocessor configured to energize the motor in response to detection of manual manipulation of the manipulatable part; and
   a non-transitory computer-readable medium comprising computer-readable instructions that are executable by the microprocessor to:
   in response to detection of kickback, cause the motor to generate a first electric braking force to stop rotation of a rotor of the motor; and
   in response to detection of a state change of the manipulatable part from a manipulated state or ON state to an unmanipulated state or OFF state, cause the motor to generate a second electric braking force, which is weaker than the first braking force.

2. The electric work machine according to the above embodiment 1, wherein the non-transitory computer-readable medium comprising computer-readable instructions that are executable by the microprocessor to cause the second electric braking force to be first generated only after a preset standby time since the state change of the manipulatable part.

3. The electric work machine according to the above embodiment 1, wherein the non-transitory computer-readable medium comprising computer-readable instructions that are executable by the microprocessor to cause the second electric braking force to be first generated only after a rotational speed of the rotor has fallen to or below a preset prescribed rotational speed after the state change of the manipulatable part.

4. The electric work machine according to any one of the above-embodiments 1-3, further comprising:
   an inverter that comprises a plurality of switching devices and supplies three-phase alternating current to the motor;
   wherein:
   the motor is a three-phase brushless motor;
   the first braking control causes the first braking force to be generated by switching the ON/OFF state of each of the plurality of the switching devices in accordance with a first motor rotational angle of the motor;
   the second braking control causes the second braking force to be generated by switching the ON/OFF state of each of a plurality of the switching devices in accordance with a second motor rotational angle of the motor; and the first motor rotational angle differs from the second motor rotational angle.

5. The electric work machine according to the above embodiment 4, wherein:

the first braking control causes the first braking force to be generated by switching the ON/OFF state of each of the plurality of switching devices at a timing at which the rotor of the motor has rotated by a preset first braking delay angle (θn) from a preset reference timing;

the second braking control causes the second braking force to be generated by switching the ON/OFF state of each of the plurality of switching devices at a timing at which the rotor of the motor has rotated by a preset second braking delay angle (θa) from the preset reference timing; and the second braking delay angle is larger than the first braking delay angle.

6. The electric work machine according to the above embodiment 4, wherein:

a ratio of three-phase braking periods performed during the first braking control, in which the motor is caused to generate the first braking force by supplying electric current to all three phases of the three-phase brushless motor, is larger than a ratio of such three-phase braking periods performed during the second braking control; and a ratio of two-phase braking periods performed during the second braking control, in which the motor is caused to generate the second braking force by supplying electric current to only two of the three phases of the three-phase brushless motor, is larger than a ratio of such two-phase braking periods performed during the first braking control.

7. The electric work machine according to the above embodiment 4, wherein:

a ratio of two-phase braking periods performed during the first braking control, in which the motor is caused to generate the first braking force by supplying electric current to only two of the three phases of the three-phase brushless motor, is larger than a ratio of such two-phase braking periods performed during the second braking control; and a ratio of brake-OFF periods performed during the second braking control, in which the motor is caused to generate the second braking force by not supplying electric current to all three phases of the three-phase brushless motor, is larger than a ratio of such brake-OFF periods performed during the first braking control.

8. The electric work machine according to any one of the above-embodiments 1-4, wherein:

the first braking control causes the first braking force to be generated by using at least three-phase, short-circuit braking; and the second braking control causes the second braking force to be generated using at least two-phase, short-circuit braking.

9. The electric work machine according to any one of the above-embodiments 1-8, wherein the non-transitory computer-readable medium further comprises computer-readable instructions that are executable by the microprocessor to detect kickback based on Hall effect signals output by a Hall sensor unit mounted on the motor.

10. The electric work machine according to any one of the above-embodiments 1-8, further comprising an accelerometer disposed in or on a body of the electric work machine and electrically connected to the microprocessor;

wherein the non-transitory computer-readable medium further comprises computer-readable instructions that are executable by the microprocessor to detect kickback based on acceleration signals output by the accelerometer.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines, such as cordless or corded power tools and outdoor power equipment.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Electric work machine
9 Trigger
11 Motor
20 Control unit

The invention claimed is:

1. A circular saw comprising:
a battery having a positive electrode and a negative electrode;
a trigger switch configured to be manually turned ON and OFF;
a three-phase brushless motor including a rotor and three terminals;
a circular-shaped saw blade configured to be rotated by the three-phase brushless motor;
a Hall-effect sensor unit configured to output three Hall-effect sensor signals based on changes in a magnetic field attendant with rotation of the rotor, the three Hall-effect sensor signals corresponding to respective phases of the three-phase brushless motor;
a three-phase inverter including first to sixth switching devices, the first to sixth switching devices forming a three-phase full bridge circuit that is electrically connected to the positive electrode, to the negative electrode, and to the three terminals;
a controller electrically connected to the battery, to the trigger switch, to the Hall-effect sensor unit, and to the three-phase inverter, the controller being configured to perform a circular saw controlling process, and the circular saw controlling process including:
determining whether the trigger switch is in an ON state;

in response to a determination that the trigger switch is in the ON state, performing a motor-drive process that includes driving the three-phase brushless motor via the three-phase inverter based on the three Hall-effect sensor signals;

then performing a kickback-detection process that includes: (i) determining a rate-of-change corresponding to an amount of change per unit of time of a rotational speed of the rotor of the three-phase brushless motor, (ii) comparing the determined rate-of-change with a predetermined kickback-determination rate-of-change, and (iii) determining that a kickback of the circular saw from a workpiece is occurring or has occurred in response to a determination that the rate-of-change is smaller than the predetermined kickback-determination rate-of-change;

in response to a determination that kickback is occurring or has occurred, performing (i) an at-kickback braking process that includes turning ON or OFF the first to sixth switching devices individually so as to generate a first braking force in the three-phase brushless motor or (ii) an at-trigger-OFF braking process that includes turning ON or OFF the first to sixth switching devices individually so as to generate a second braking force in the three-phase brushless motor, the second braking force being weaker than the first braking force;

in response to a determination that kickback is not occurring or has not occurred, determining whether the trigger switch is in an OFF state; and in response to a determination that the trigger switch is in the OFF state, performing (i) the at-trigger-OFF breaking process or (ii) a free-running process until the rotational speed of the rotor reduces to a predetermined standby rotational speed or until a predetermined standby time elapses and then performing the at-trigger-off breaking process, wherein the free-running process includes turning OFF all of the first to sixth switching devices.

2. An electric work machine comprising:
a motor;
a manipulatable part configured to be manipulated by a user;
a control part configured to energize the motor in response to detection of manipulation of the manipulatable part; and
a kickback-detection circuit configured to detect kickback of the electric work machine from a work object;
wherein the control part is configured to perform:
  a first braking control that, in response to kickback having been detected by the kickback-detection circuit, causes the motor to generate a first braking force to stop rotation of a rotor of the motor; and
  a second braking control that, in response to detection of a state change of the manipulatable part from a manipulated state or ON state to an unmanipulated state or OFF state, causes the motor to generate a second braking force, which is weaker than the first braking force.

3. The electric work machine according to claim 2, further comprising:
an inverter that includes a plurality of switching devices and that is configured to supply three-phase alternating current to the motor;
wherein:
the motor is a three-phase brushless motor;
the first braking control causes the first braking force to be generated by switching the ON/OFF state of each of the plurality of the switching devices in accordance with a first rotational angle of the motor;
the second braking control causes the second braking force to be generated by switching the ON/OFF state of each of the plurality of the switching devices in accordance with a second rotational angle of the motor; and
the first rotational angle differs from the second rotational angle.

4. The electric work machine according to claim 3, wherein:
the first braking control causes the first braking force to be generated by switching the ON/OFF state of each of the plurality of switching devices at a timing at which the rotor of the motor has rotated by a preset first braking delay angle from a preset reference timing;
the second braking control causes the second braking force to be generated by switching the ON/OFF state of each of the plurality of switching devices at a timing at which the rotor of the motor has rotated by a preset second braking delay angle from the preset reference timing; and
the second braking delay angle is larger than the first braking delay angle.

5. The electric work machine according to claim 2, wherein:
the first braking control causes the first braking force to be generated by using at least three-phase, short-circuit braking; and
the second braking control causes the second braking force to be generated by using at least two-phase, short-circuit braking.

6. The electric work machine according to claim 3, wherein:
each of the first braking control and the second braking control includes three-phase braking periods and two-phase braking periods,
during each of the three-phase braking periods, electric current is supplied to all three phases of the three-phase brushless motor to generate the first braking force,
during each of the two-phase braking periods, electric current is supplied to only two of the three phases of the three-phase brushless motor to generate the second braking force,
a ratio of the three-phase braking periods performed during the first braking control is larger than a ratio of the three-phase braking periods performed during the second braking control, and
a ratio of the two-phase braking periods performed during the second braking control is larger than a ratio of the two-phase braking periods performed during the first braking control.

7. The electric work machine according to claim 3, wherein:
each of the first braking control and the second braking control includes two-phase braking periods and brake-OFF periods,
during each of the two-phase braking periods, electric current is supplied to only two of three phases of the three-phase brushless motor to generate the first braking force,
during each of the brake-OFF periods, electric current is not supplied to all three phases of the three-phase brushless motor to generate the second braking force, a ratio of the two-phase braking periods performed during the first braking control is larger than a ratio of the two-phase braking periods performed during the second braking control, and a ratio of the brake-OFF periods performed during the second braking control is larger than a ratio of the brake-OFF periods performed during the first braking control.

8. An electric work machine comprising:
a motor;
a manipulatable part configured to be manipulated by a user;
a control part configured to energize the motor when the manipulatable part is manipulated; and
a kickback-detection circuit configured to detect kickback of the electric work machine from a work object;
wherein the control part is configured to perform:
a first braking control that, immediately after kickback has been detected by the kickback-detection circuit, causes the motor to generate a first braking force to stop rotation of a rotor of the motor; and
a second braking control that, in response to detection of a state change of the manipulatable part from a manipulated state or ON state to an unmanipulated state or OFF state, causes a second braking force to be generated after a preset standby time has elapsed.

9. The electric work machine according to claim 8, further comprising:
an inverter that includes a plurality of switching devices and that is configured to supply three-phase alternating current to the motor;
wherein:
the motor is a three-phase brushless motor;
the first braking control causes the first braking force to be generated by switching the ON/OFF state of each of the plurality of switching devices in accordance with a first rotational angle of the motor;
the second braking control causes the second braking force to be generated by switching the ON/OFF state of each of the plurality of switching devices in accordance with a second rotational angle of the motor; and
the first rotational angle differs from the second rotational angle.

10. The electric work machine according to claim 9, wherein:
the first braking control causes the first braking force to be generated by switching the ON/OFF state of each of the plurality of switching devices at a timing at which the rotor of the motor has rotated by a preset first braking delay angle from a preset reference timing;
the second braking control causes the second braking force to be generated by switching the ON/OFF state of each of the plurality of switching devices at a timing at which the rotor of the motor has rotated by a preset second braking delay angle from the preset reference timing; and
the second braking delay angle is larger than the first braking delay angle.

11. The electric work machine according to claim 8, wherein:
the first braking control causes the first braking force to be generated by using at least three-phase, short-circuit braking; and
the second braking control causes the second braking force to be generated by using at least two-phase, short-circuit braking.

12. The electric work machine according to claim 9, wherein:
each of the first braking control and the second braking control includes three-phase braking periods and two-phase braking periods,
during each of the three-phase braking periods, electric current is supplied to all three phases of the three-phase brushless motor to generate the first braking force,
during each of the two-phase braking periods, electric current is supplied to only two of the three phases of the three-phase brushless motor to generate the second braking force,
a ratio of the three-phase braking periods performed during the first braking control is larger than a ratio of the three-phase braking periods performed during the second braking control, and
a ratio of the two-phase braking periods performed during the second braking control is larger than a ratio of the two-phase braking periods performed during the first braking control.

13. The electric work machine according to claim 9, wherein:
each of the first braking control and the second braking control includes two-phase braking periods and brake-OFF periods,
during each of the two-phase braking periods, electric current is supplied to only two of three phases of the three-phase brushless motor to generate the first braking force,
during each of the brake-OFF periods, electric current is not supplied to all three phases of the three-phase brushless motor to generate the second braking force,
a ratio of the two-phase braking periods performed during the first braking control is larger than a ratio of the two-phase braking periods performed during the second braking control, and
a ratio of the brake-OFF periods performed during the second braking control is larger than a ratio of the brake-OFF periods performed during the first braking control.

14. The electric work machine according to claim 8, wherein the second braking force is weaker than the first braking force.

15. An electric work machine comprising:
a motor;
a manipulatable part configured to be manipulated by a user;
a control part configured to energize the motor when the manipulatable part is manipulated; and
a kickback-detection circuit configured to detect kickback of the electric work machine from a work object;
wherein the control part is configured to perform:
a first braking control that, immediately after the kickback has been detected by the kickback-detection circuit, causes the motor to generate a first braking force to stop rotation of a rotor of the motor; and
a second braking control that, in response to detection of a state change of the manipulatable part from a manipulated state or ON state, to an unmanipulated state or OFF state, causes a second braking force to be generated after a rotational speed of the motor has fallen to or below a preset rotational speed.

16. The electric work machine according to claim 15, further comprising:
an inverter that includes a plurality of switching devices and that is configured to supply three-phase alternating current to the motor;

wherein:
the motor is a three-phase brushless motor;
the first braking control causes the first braking force to be generated by switching the ON/OFF state of each of the plurality of the switching devices in accordance with a first rotational angle of the motor;
the second braking control causes the second braking force to be generated by switching the ON/OFF state of each of the plurality of the switching devices in accordance with a second rotational angle of the motor; and
the first rotational angle differs from the second rotational angle.

17. The electric work machine according to claim 16, wherein:
the first braking control causes the first braking force to be generated by switching the ON/OFF state of each of the plurality of switching devices at a timing at which the motor has rotated by a preset first braking delay angle from a preset reference timing;
the second braking control causes the second braking force to be generated by switching the ON/OFF state of each of the plurality of switching devices at a timing at which the motor has rotated by a preset second braking delay angle from the preset reference timing; and
the second braking delay angle is larger than the first braking delay angle.

18. The electric work machine according to claim 15, wherein:
the first braking control causes the first braking force to be generated by using at least three-phase, short-circuit braking; and
the second braking control causes the second braking force to be generated by using at least two-phase, short-circuit braking.

19. The electric work machine according to claim 16, wherein:
each of the first braking control and the second braking control includes three-phase braking periods and two-phase braking periods,
during each of the three-phase braking periods, electric current is supplied to all three phases of the three-phase brushless motor to generate the first braking force,
during each of the two-phase braking periods, electric current is supplied to only two of the three phases of the three-phase brushless motor to generate the second braking force,
a ratio of the three-phase braking periods performed during the fifth first braking control is larger than a ratio of the three-phase braking periods performed during the sixth second braking control, and
a ratio of the two-phase braking periods performed during the second braking control is larger than a ratio of the two-phase braking periods performed during the first braking control.

20. The electric work machine according to claim 16, wherein:
each of the first braking control and the second braking control includes two-phase braking periods and brake-OFF periods,
during each of the two-phase braking periods, electric current is supplied to only two of three phases of the three-phase brushless motor to generate the first braking force,
during each of the brake-OFF periods, electric current is not supplied to all three phases of the three-phase brushless motor to generate the second braking force,
a ratio of the two-phase braking periods performed during the first braking control is larger than a ratio of the two-phase braking periods performed during the second braking control, and
a ratio of the brake-OFF periods performed during the second braking control is larger than a ratio of the brake-OFF periods performed during the first braking control.

21. The electric work machine according to claim 15, wherein the second braking force is weaker than the first braking force.

* * * * *